US009820335B2

(12) United States Patent
Pinheiro et al.

(10) Patent No.: US 9,820,335 B2
(45) Date of Patent: Nov. 14, 2017

(54) SYSTEM AND METHOD FOR SHARING A COMMON PDP CONTEXT

(75) Inventors: Ana Lucia A. Pinheiro, Breinigsville, PA (US); Samian J. Kaur, Plymouth Meeting, PA (US); Inhyok Cha, Seoul (KR); Dolores F. Howry, Malvern, PA (US); Michael F. Starsinic, Newtown, PA (US); Debjani Majumder, Bangalore (IN); Dale N. Seed, Allentown, PA (US); Chonggang Wang, Princeton, NJ (US); Lijun Dong, Bridgeport, PA (US); Guang Lu, Dollard-des-Ormeaux (CA); Zongrui Ding, King of Prussia, PA (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 0 days.

(21) Appl. No.: 13/435,479

(22) Filed: Mar. 30, 2012

(65) Prior Publication Data

US 2013/0155948 A1 Jun. 20, 2013

Related U.S. Application Data

(60) Provisional application No. 61/470,867, filed on Apr. 1, 2011.

(51) Int. Cl.
*H04W 88/08* (2009.01)
*H04W 4/00* (2009.01)
(Continued)

(52) U.S. Cl.
CPC ........... *H04W 88/08* (2013.01); *H04W 4/005* (2013.01); *H04W 12/06* (2013.01); *H04W 76/02* (2013.01);
(Continued)

(58) Field of Classification Search
CPC ..... H04W 4/005; H04W 76/02; H04W 12/06; H04W 80/04; H04W 84/042;
(Continued)

(56) References Cited

U.S. PATENT DOCUMENTS 7,522,613 B2 * 4/2009 Rotsten et al. ............... 370/400
7,680,109 B2 * 3/2010 Lundin et al. ................ 370/390
(Continued)

FOREIGN PATENT DOCUMENTS

CN 1666883 A 9/2005
CN 101176330 A 5/2008
(Continued)

OTHER PUBLICATIONS

GPRS Attach and PDP Context Activation.*
(Continued)

*Primary Examiner* — Charles C Jiang
*Assistant Examiner* — Oussama Roudani
(74) *Attorney, Agent, or Firm* — Condo Roccia Koptiw LLP

(57) ABSTRACT

Disclosed herein are methods and devices for sharing a packet data protocol (PDP) context among a plurality of devices. For example, a method or sharing a PDP context among a plurality of devices may include a wireless transmit/receive unit (WTRU) sending a request to establish or modify a PDP context. The request to establish or modify the PDP context may include an indication that the WTRU is a member of shared context group. The method may also include the WTRU receiving a response indicating that the request to establish or modify the PDP context was accepted. The method may also include the WTRU acting as a gateway for at least one other device in the shared context group. The request to establish or modify the PDP context may be an attach request. The indication that the WTRU is
(Continued)

a member of shared context group may be a group identifier (ID).

17 Claims, 19 Drawing Sheets

(51) Int. Cl.
*H04W 76/02* (2009.01)
*H04W 12/06* (2009.01)
*H04W 80/04* (2009.01)
*H04W 84/04* (2009.01)
*H04W 88/02* (2009.01)
*H04W 88/14* (2009.01)
*H04W 88/16* (2009.01)

(52) U.S. Cl.
CPC .......... *H04W 80/04* (2013.01); *H04W 84/042* (2013.01); *H04W 88/02* (2013.01); *H04W 88/14* (2013.01); *H04W 88/16* (2013.01)

(58) Field of Classification Search
CPC ..... H04W 88/02; H04W 88/08; H04W 88/16; H04W 40/246; H04L 12/189; H04L 12/185
USPC ....... 370/328, 390, 400, 315, 312, 352, 401, 370/230, 235, 252, 311, 335, 342, 356, 370/392, 469; 455/422
See application file for complete search history.

(56) References Cited

U.S. PATENT DOCUMENTS

| | | | |
|---|---|---|---|
| 7,911,943 B2 | 3/2011 | Rasanen et al. | |
| 8,514,756 B1* | 8/2013 | Ramachandra et al. | 370/310 |
| 2004/0223489 A1 | 11/2004 | Rotsten et al. | |
| 2005/0200889 A1 | 9/2005 | Oomura et al. | |
| 2006/0034278 A1 | 2/2006 | Hundscheidt et al. | |
| 2008/0200146 A1 | 8/2008 | Wang et al. | |
| 2009/0010195 A1 | 1/2009 | Gonsa et al. | |
| 2009/0059790 A1 | 3/2009 | Calvert et al. | |
| 2009/0131053 A1 | 5/2009 | Sachs et al. | |
| 2009/0168692 A1 | 7/2009 | Chen | |
| 2009/0175215 A1 | 7/2009 | Chen et al. | |
| 2009/0296630 A1 | 12/2009 | Chen et al. | |
| 2011/0032868 A1 | 2/2011 | Huang | |
| 2011/0075633 A1 | 3/2011 | Johansson et al. | |
| 2011/0136488 A1 | 6/2011 | Kuvvali et al. | |
| 2011/0201365 A1* | 8/2011 | Segura | H04W 4/005 455/466 |
| 2011/0249610 A1 | 10/2011 | Ho et al. | |
| 2011/0307694 A1* | 12/2011 | Broustis et al. | 713/163 |
| 2012/0087359 A1 | 4/2012 | Chen et al. | |
| 2012/0087360 A1 | 4/2012 | Chen et al. | |
| 2012/0172063 A1 | 7/2012 | Lee et al. | |
| 2012/0218965 A1 | 8/2012 | Chen | |
| 2012/0224477 A1 | 9/2012 | Balasubramanian et al. | |
| 2012/0302229 A1* | 11/2012 | Ronneke | 455/422.1 |
| 2013/0051309 A1* | 2/2013 | Van Phan et al. | 370/315 |
| 2013/0163520 A1 | 6/2013 | Kimura | |
| 2013/0188503 A1 | 7/2013 | Anepu et al. | |
| 2013/0189955 A1* | 7/2013 | Horn | H04W 4/08 455/411 |
| 2013/0336305 A1 | 12/2013 | Yan et al. | |

FOREIGN PATENT DOCUMENTS

| | | | |
|---|---|---|---|
| CN | 101176332 A | 5/2008 | |
| CN | 101207585 A | 6/2008 | |
| EP | 1869841 A1 | 12/2007 | |
| EP | 2498527 A1 | 9/2012 | |
| JP | 2008-535302 A | 8/2008 | |
| JP | 2008-536372 A | 9/2008 | |
| JP | 2012-080413 A | 4/2012 | |
| JP | 2013-510472 A | 3/2013 | |
| TW | 463509 B | 11/2001 | |
| TW | 201106762 A | 2/2011 | |
| WO | WO-9917497 A2 | 4/1999 | |
| WO | WO 03/017703 A1 | 2/2003 | |
| WO | WO 03/036872 A1 | 5/2003 | |
| WO | WO 2006/100475 A1 | 9/2006 | |
| WO | WO 2011/054142 A1 | 5/2011 | |
| WO | WO 2011/060707 A1 | 5/2011 | |
| WO | WO 2012/041363 A1 | 4/2012 | |
| WO | WO 2012/135680 A1 | 10/2012 | |

OTHER PUBLICATIONS

GPRS—PDP Context.*
3GPP TS 23.060 V.10.3.0, Mar. 2011.*
3rd Generation Partnership Project (3GPP), S1-100140, "Group based RAB & IP Assignment for TS 22.368", InterDigital Communication Corporation, 3GPP TSG-SA1 #49, San Francisco, USA, Feb. 22-26, 2010, 2 pages.
3rd Generation Partnership Project (3GPP), S2-103106, "Resource Sharing Solution for MTC Groups", NIMTC/Rel-10, 3GPP TSG SA WG2 Meeting # S2-79E, May 6-13, 2010, 1-4.
3rd Generation Partnership Project (3GPP), TD S2-112329, Key Issue—"Efficiently Maintain Connectivity for a Large Number of MTC Devices", ZTE, 3GPP TSG SA WG2 Meeting #85, Xi'an, P.R.China, May 16-May 20, 2011, 1-3.
3rd Generation Partnership Project (3GPP), TR 23.888 V1.4.0, "Technical Specification.Group Services and System Aspects", System Improvements for Machine-Type Communications, (Release 11), Aug. 2011, 1-139.
3rd Generation Partnership Project (3GPP), TS 22.368 V11.2.0, "Technical Specification Group Services and System Aspects", Service Requirements for Machine-Type Communications(MTC), Stage 1 (Release 11), Jun. 2011, 1-25.
3rd Generation Partnership Project (3GPP), TS 24.301 V10.2.0, "Technical Specification Group Core Network and Terminals, Non-Access-Stratum (NAS) Protocol for Evolved Packet System (EPS), Stage 3 (Release 10)", Mar. 2011, 1-315.
3rd Generation Partnership Project (3GPP), TS 36.321 V10.2.0, "Technical Specification.Group Radio Access Network, Evolved Universal Terrestrial Radio Access (E-UTRA), Medium Access Control (MAC) Protocol Specification (Release 10)", Jun. 2011, 1-54.
3rd Generation Partnership Project (3GPP), TSG-SA WG1 Meeting #51, S1-102286 "3rd Generation Partnership Project; Technical Specification Group Services and System Aspects; Study on Enhancements for MTC (Release 11)", Aug. 2010, 1-17.
3rd Generation Partnership Project (3GPP), TS 23.401 V10.2.1, "3rd Generation Partnership Project; Technical Specification Group Services and System Aspects; General Packet Radio Service (GPRS) enhancements for Evolved Universal Terrestrial Radio Access Network (E-UTRAN) access (Release 10)", Jan. 2011, 1-276.
3rd Generation Partnership Project (3GPP), S1-102143, "Discussion on MTC Gateway for Capillary Network", ITRI, 3GPP TSG-SA WG1 Meeting #51, Aug. 23-27, 2010, 4 pages.
3rd Generation Partnership Project (3GPP), S1-110054, "Potential Service Requirements for Communications via MTC Gateway Device", Panasonic, China Mobile, ITRI, ZTE, 3GPP TSG-SA WG1 Meeting #53, Feb. 14-18, 2011, 6 pages.
3rd Generation Partnership Project (3GPP), S1-110359, "Technical Specification Group Services and System Aspects; Study on Enhancements for MTC; (Release 11)", Feb. 14-18, 2011, 12 pages.
3rd Generation Partnership Project (3GPP), S2-101952, "Correction of Request Type", Huawei, 3GPP TSG SA WG2 Meeting #78bis-E, Elbonia, Apr. 12-15, 2010, 3 pages.
3rd Generation Partnership Project (3GPP), TR 25.905 V2.0.0, "Technical Specification Group Radio Access Network, Improvement of the Multimedia Broadcast Multicast Service (MBMS) in UTRAN (Release 7)", Dec. 2006, pp. 1-40.

(56) References Cited

OTHER PUBLICATIONS

Esaki, Hiroshi, "Impress Standard Textbook Series IPv6 Textbook", Supervision of Hiroshi Esaki, Japan, Impress R&D, Nov. 21, 2007, pp. 91-105.

IRI Ubiquitous Institute, "Mastering TCP/IP IPv6 Editing", IRI, Ubiquitous Networking Laboratory Joint Authorship, Japan, Ohmsha Ltd., ISBN: 4-274-06585-5, The First Edition, Feb. 1, 2005, pp. 295-303.

3rd Generation Partnership Project (3GPP), NP-040247, "CRs to Rel-6 on Work Item:TEL", 3GPP TSG-CN Meeting #24, Seoul, Korea, Jun. 2-4, 2004, 18 pages.

3rd Generation Partnership Project (3GPP), TR 23.888 V1.1.0, "3rd Generation Partnership Project; Technical Specification Group Services and System Aspects; System Improvements for Machine-Type Communications; (Release 11)", Mar. 2011, 94 pages.

3rd Generation Partnership Project (3GPP), TS 22.368 V11.0.1, "3rd Generation Partnership Project; Technical Specification Group Services and System Aspects; Service requirements for Machine-Type Communications (MTC); Stage 1 (Release 11) ", Feb. 2011, 23 pages.

3rd Generation Partnership Project (3GPP), TS 29.060 V9.5.2, "3rd Generation Partnership Project; Technical Specification Group Core Network and Terminals; General Packet Radio Service (GPRS); GPRS Tunnelling Protocol (GTP) across the Gn and Gp interface (Release 9)", Feb. 2011, 162 pages.

3rd Generation Partnership Project (3GPP), TS 24.008 V10.1.0, "3rd Generation Partnership Project; Technical Specification Group Core Network and Terminals; Mobile radio interface Layer 3 specification; Core network protocols; Stage 3 (Release 10)", Dec. 2010, 55 pages.

3rd Generation Partnership Project (3GPP), S1-110359, "3rd Generation Partnership Project; Technical Specification Group Services and System Aspects; Study on Enhancements for MTC; (Release 11)", 3GPP TSG-SA Meeting #53, Nashville, USA, Feb. 14-18, 2011, 21 pages.

European Telecommunications Standards Institute (ETSI), TS 102 690 V0.12.3, "Machine-to-Machine communications (M2M); Functional architecture", Jun. 2011, 268 pages.

\* cited by examiner

SYSTEM AND METHOD FOR SHARING A COMMON PDP CONTEXT

CROSS REFERENCE TO RELATED APPLICATIONS

This application claims the benefit of U.S. Provisional Patent Application No. 61/470,867 filed Apr. 1, 2011, the contents of which are hereby incorporated by reference herein.

BACKGROUND

As the number of devices connecting to cellular data networks continues to increase, there is increased pressure to more efficiently utilize network resources while maintaining a desired level of quality of service (QoS). Machine type communication (MTC) devices are expected to be an increasingly large share of the devices that access next generation cellular networks. Some expect that the number of MTC devices accessing cellular networks may be several orders of magnitude greater than "traditional" devices (e.g., cell phones and other user equipment (UE)). Many of the MTC devices may be relatively stationary and/or generate low volumes of traffic that often occur in bursts. However, these MTC devices have the capability to generate normal quantities of signaling, meaning that the network should still allow these devices to send and/or receive more traditional quantities of data in a timely manner. Thus, systems should be defined to strike a balance between optimized resource utilization in the network while still providing sufficient service to these devices.

SUMMARY

Disclosed herein are methods and devices for sharing a packet data protocol (PDP) context among a plurality of devices. For example, a method or sharing a PDP context among a plurality of devices may include a wireless transmit/receive unit (WTRU) sending a request to establish or modify a PDP context. The request to establish or modify the PDP context may include an indication that the WTRU is a member of shared context group. The method may also include the WTRU receiving a response indicating that the request to establish or modify the PDP context was accepted. The method may also include the WTRU acting as a gateway for at least one other device in the shared context group. The request to establish or modify the PDP context may be an attach request. The indication that the WTRU is a member of shared context group may be a Group identification (ID).

The method may further include the WTRU authenticating with one or more core network nodes. The WTRU may authenticate at least one other device that is a member of the shared context group when the WTRU authenticates with the one or more core network nodes. The WTRU may determine an authentication response based on authentication responses of a plurality of other devices that are members of the shared context group. The request to establish or modify the PDP context may include a request for a plurality of internet protocol (IP) addresses to be allocated to a plurality of devices that are members of the shared context group sharing a common PDP context. The indication that the WTRU is a member of shared context group may be included in an evolved packet service (EPS) attach type information element. The at least one other device in the shared context group may be a non-third generation partnership project (non-3GPP) device.

A WTRU send a request to establish or modify a PDP context. The request to establish or modify the PDP context may include an indication that the WTRU is a member of shared context group. The WTRU may receive a response indicating that the request to establish or modify the PDP context was accepted. At least one other device in the shared context group may share the PDP context with the WTRU. The WTRU may share an internet protocol (IP) address with the at least one other device in the shared context group. The indication that the WTRU is a member of shared context group may be a group international mobile subscriber identity (IMSI). The WTRU may perform authentication with at least one core network node. There may be a sequence of authentication for devices in the shared context group. The WTRU may dynamically determine the sequence of authentication for devices in the shared context group. The response indicating that the request to establish or modify the PDP context was accepted may indicate a number of IP addresses allocated to the shared context group and a starting IP address. The response indicating that the request to establish or modify the PDP context was accepted may explicitly indicate an internet protocol address to be allocated to a device in the shared context group.

Methods and devices in a core network node for sharing a packet data protocol context are provided. For example, a method for sharing a PDP context may include receiving a request to establish or modify a packet data protocol (PDP) context. The request to establish or modify the PDP context may include an indication that a WTRU is a member of shared context group. The method may further include determining that at least one other device that is a member of the shared context group has previously established the PDP context. The method may further include allocating a shared default bearer from the previously established PDP context for use by the WTRU. The method may further include sending a response indicating that the request to establish or modify the PDP context was accepted. The method may further include maintaining a count of a number of devices in the shared context group that are currently utilizing the shared default bearer. The request to establish or modify the PDP context may be an attach request. The core network node may refrain from performing a location update procedure for the WTRU. The core network node may be one of a mobility management entity (MME) or a serving gateway support node (SGSN). The method may further include authenticating the WTRU based on a group identifier for the shared context group and an individual identifier for the WTRU. The WTRU may be a machine type communications (MTC) gateway.

BRIEF DESCRIPTION OF THE DRAWINGS

A more detailed understanding may be had from the following description, given by way of example in conjunction with the accompanying drawings wherein.

DETAILED DESCRIPTION

A detailed description of illustrative embodiments will now be described with reference to the various figures. Although this description provides a detailed example of possible implementations, it should be noted that the details are intended to be exemplary and in no way limit the scope of the application.

Figure 1A:
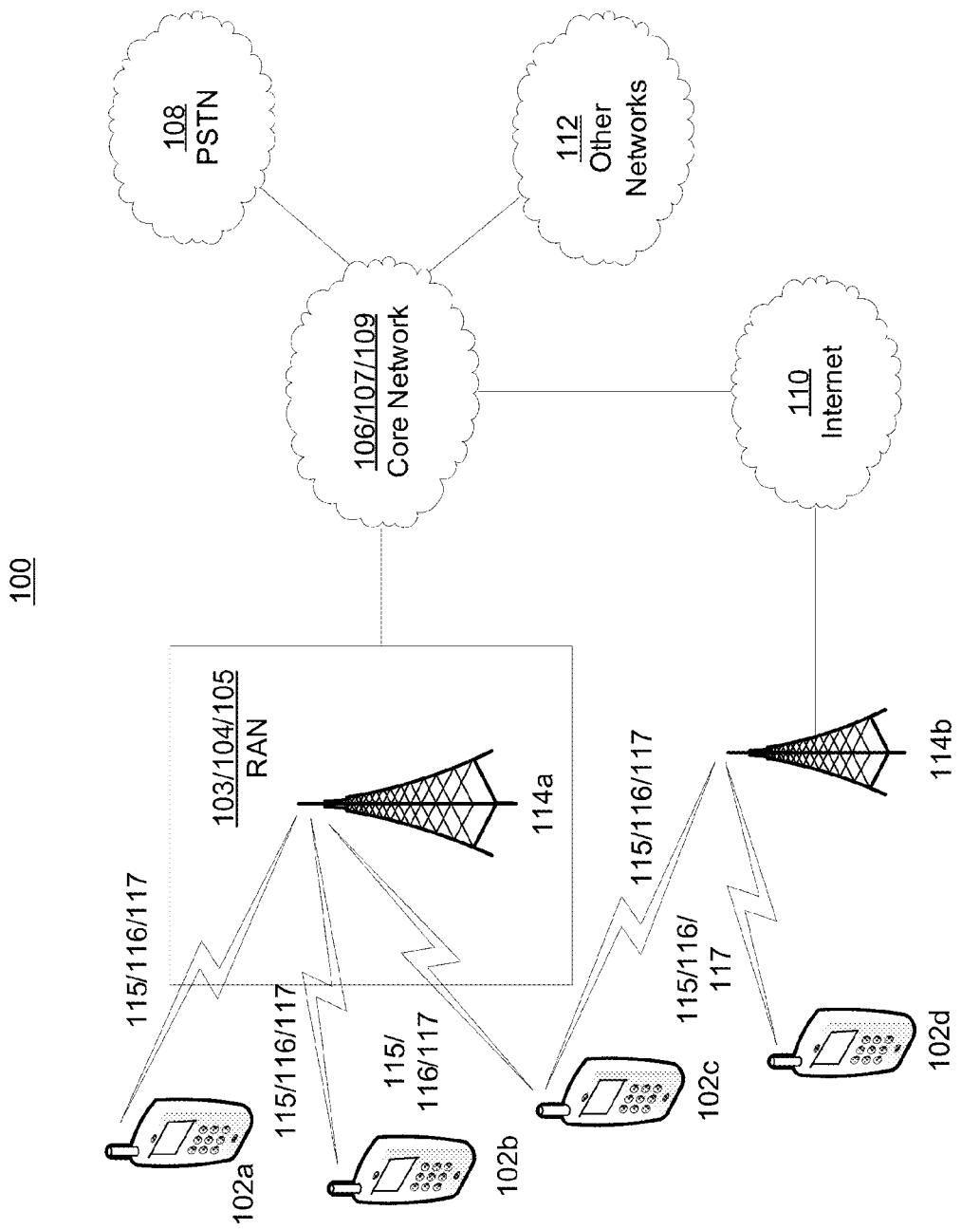
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 IX, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
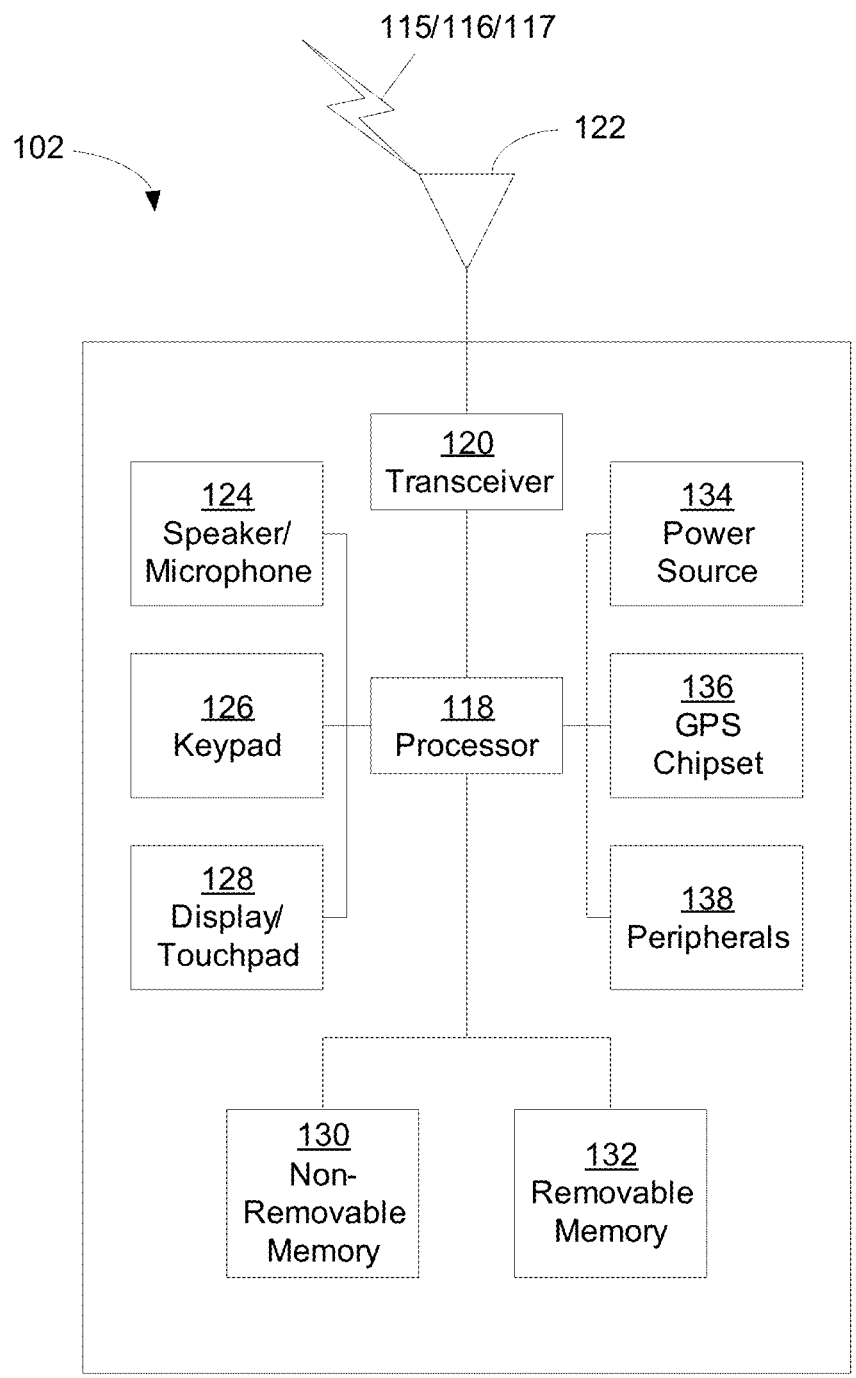
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
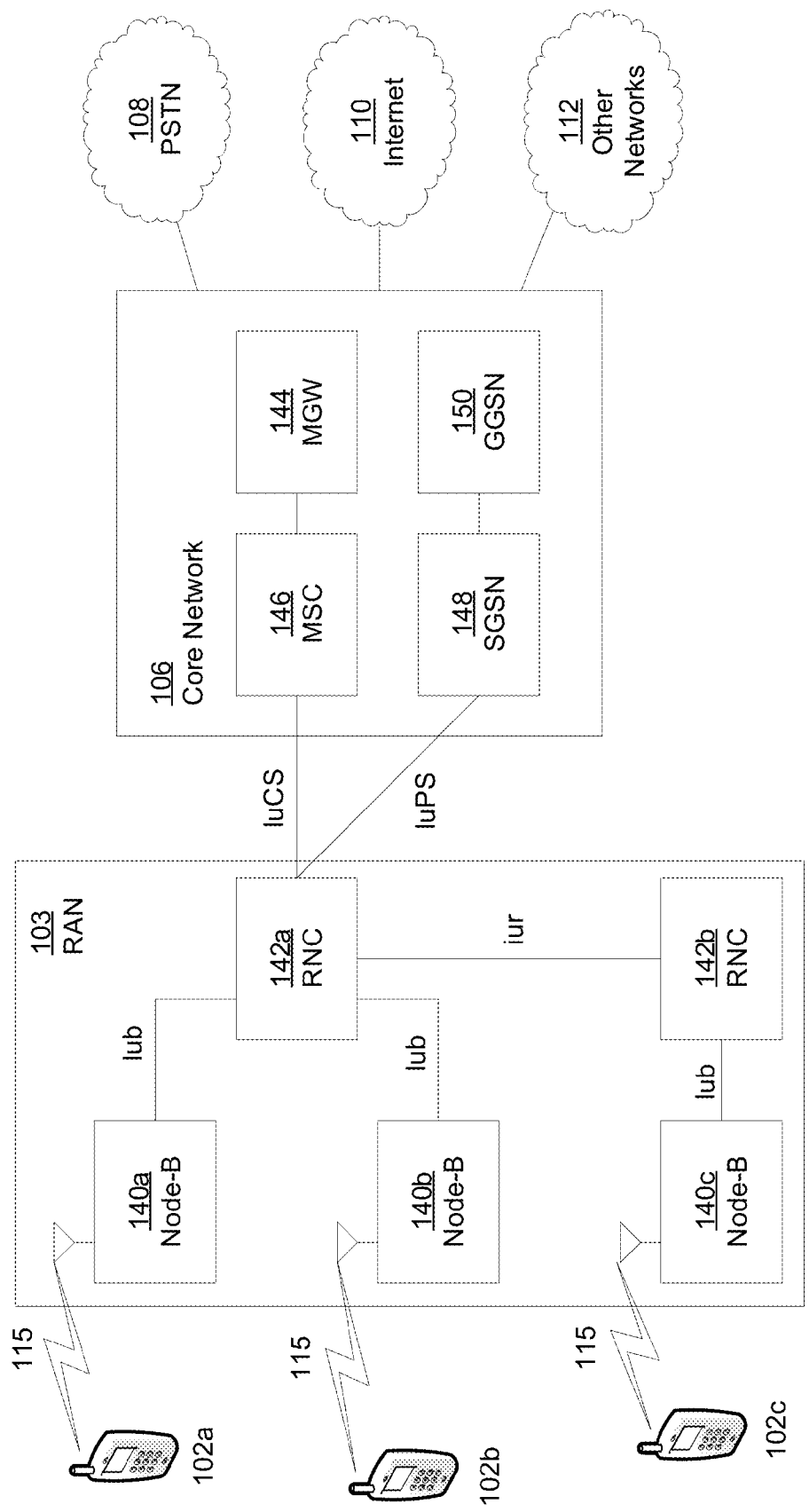
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
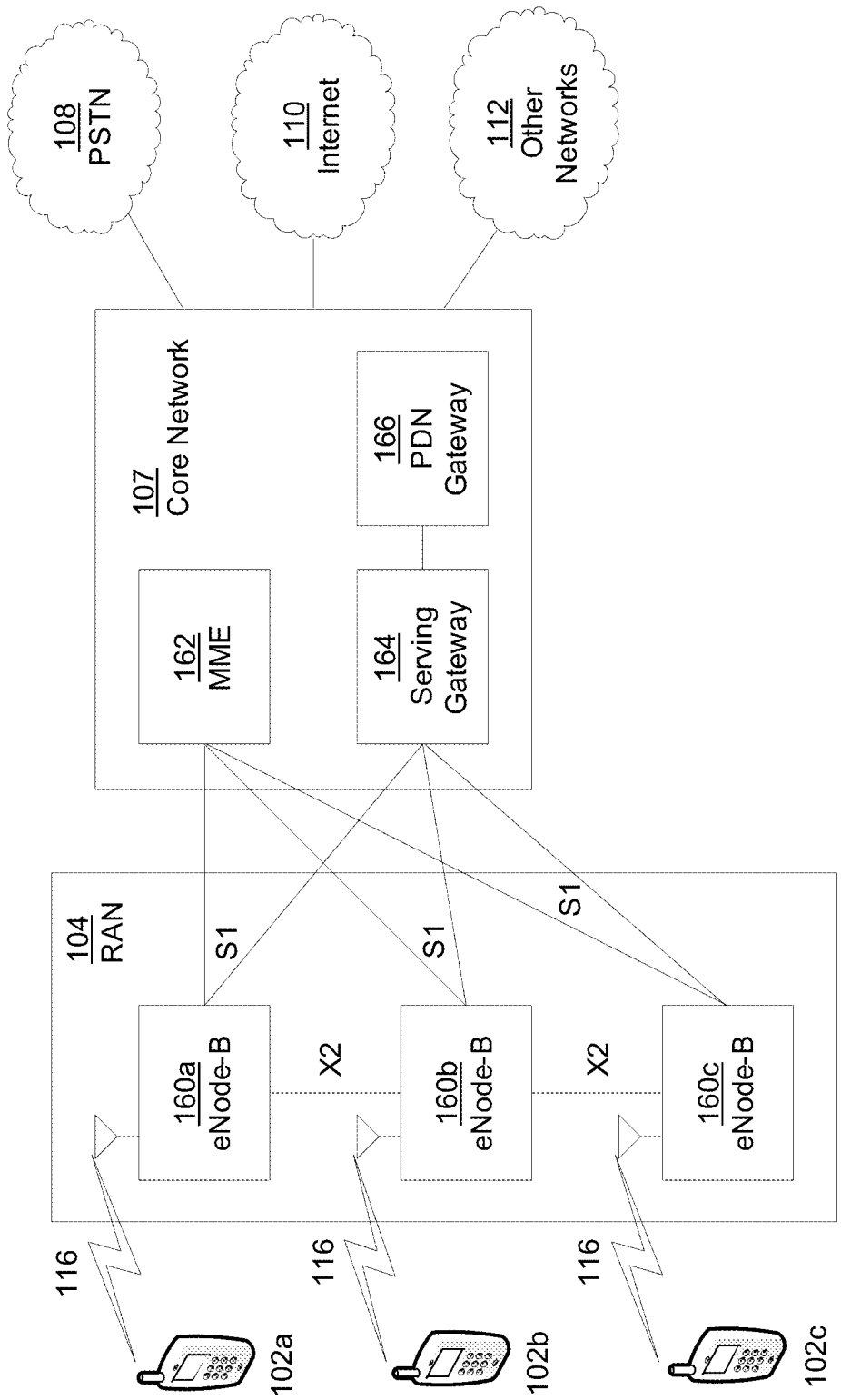
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
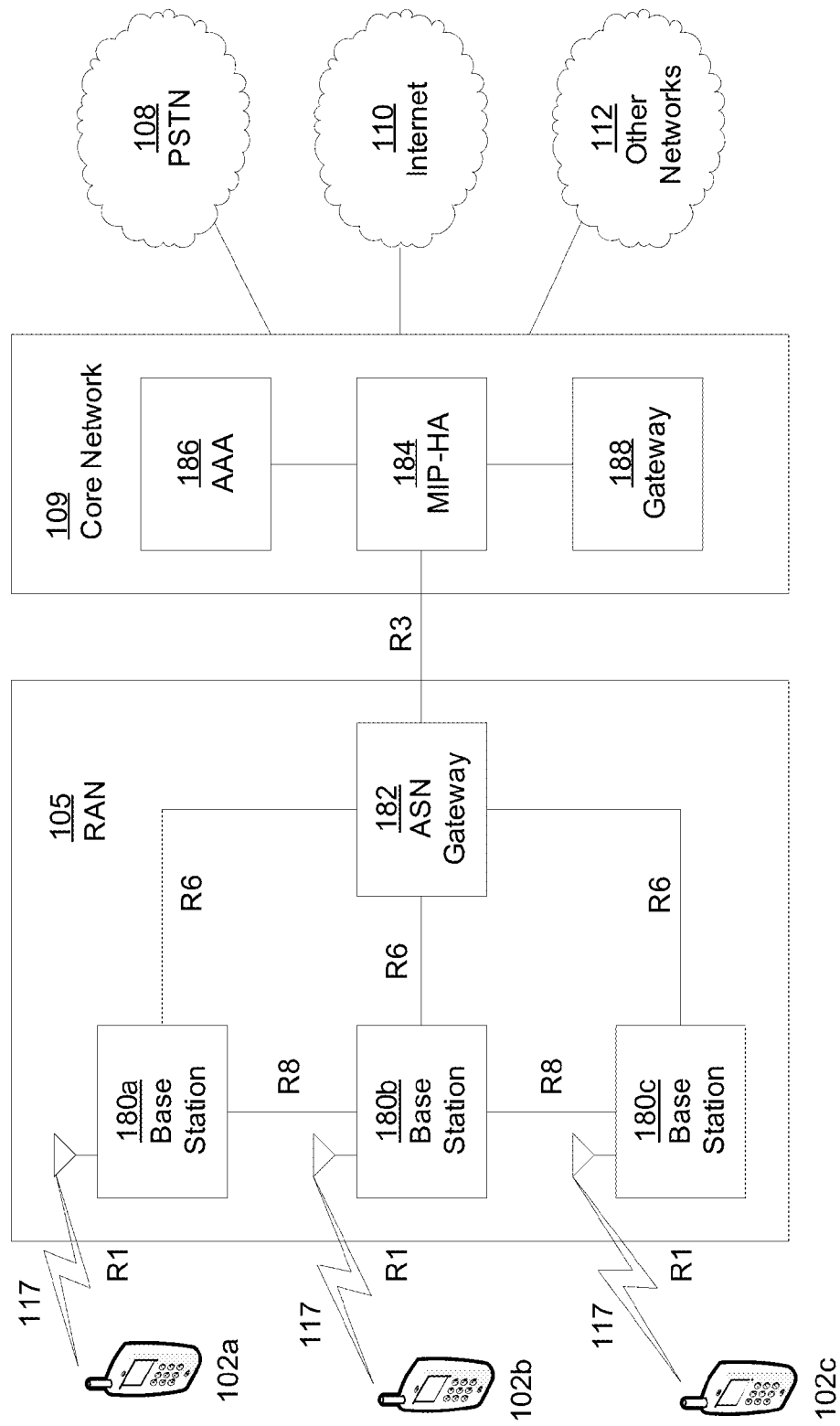
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The proliferation of MTC devices has the potential to lead to various network related issues, including data overload and traffic congestion. For example, even when each of several MTC devices is individually configured to generate minimal signal traffic, the sheer number of such devices in operation may collectively lead to a situation wherein a large traffic volume is generated, and the associated network may become overloaded. For example, it is expected that the number of MTC device in communication over the network may be several orders of magnitude larger than "traditional" devices such as WTRUs and/or UEs. With such a large number of devices attempting to connect to the network, network overload may occur in situations where a large number of devices attempt to be connected to the network at substantially the same time and/or when a large number of devices transmit and/or receive messages at substantially the same time and/or periodicity (e.g., reporting sensor measurements or other periodic reporting), even when these messages themselves carry small amounts of data.

The 3GPP specification TR 22.368 provides certain definitions pertaining to MTC small signal transmissions for MTC devices that send and/or receive small amounts of data. For example, it may be a system wide goal for the network to support transmissions of small amounts of data with minimal network impact, for example by limiting the associated signaling overhead, optimizing the use of network resources, minimizing delay for reallocation of the resources and/or the like. What constitutes a small amount of data for the network perspective may be configurable on the basis of a subscription policy and/or a network operator policy.

Many MTC devices may communicate with a MTC Server. The MTC Server may be a collection point for communications received from MTC devices. For example, the MTC devices may communicate with the MTC server via the Core Network of the cellular network. In an example, the MTC Server may be a node in the Core Network. Data congestion may occur in a mobile core network or in a communication link to the MTC server when a large number of MTC devices send/receive data simultaneously. For example, in many MTC applications, a larger number of MTC devices associated with a single MTC user may connect to a single MTC server that is coupled to a packet network of a mobile network operator via an access point name (APN) using an MTCi interface.

The data congestion may be mitigated by optimizing the resources utilized, and by reducing the signaling overhead, so as to provide scalability in the presence of a large number of devices. In an example, a group of devices is configured to share an evolved packet system (EPS) bearer or a packet data protocol (PDP) context as described herein.

Figure 2:
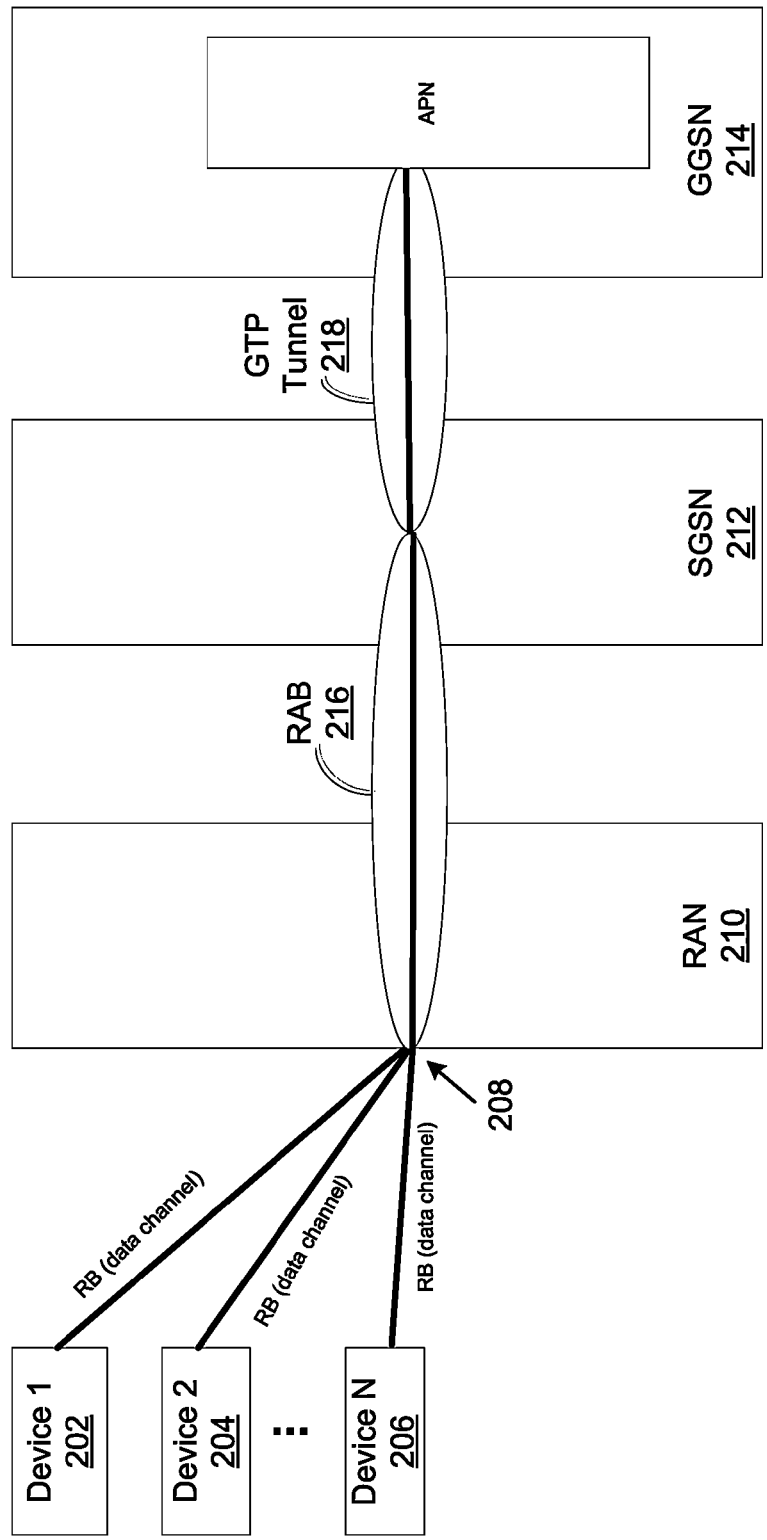
FIG. 2 illustrates an example UMTS architecture in which a shared PDP context is employed.

FIG. 2 illustrates the sharing of a PDP context amongst a plurality of devices in a UMTS network. As shown in FIG. 2, the downlink (and/or the uplink) communication link may be configured to carry data to multiple destinations (e.g., devices) by using a shared radio access bearer (RAB)/PDP context. For example, Device 1 202, Device 2 204, and Device N 206 may each transmit and/or receive data via a UMTS cellular data network. The device may establish radio bearers (RBs) for the communication of data of a data channel. In order to minimize network overhead associated with the data sent to one or more of the devices, a shared context may be established from a packet gateway (e.g., GGSN 214) to point 208 (e.g., at the base station of RAN 210). For example, at point 208 a base station, for example a Node B (NB) or an evolved Node b (eNB) may associate each of several radio bearers with a single PDP context.

A PDP context may be associated with a unique PDP address. The PDP context may also have a specified QoS assigned to ensure proper handling of packets associated with the PDP context. Each PDP context may also have a separate Radio Access Bearer (RAB) and GPRS Tunneling Protocol (GTP) tunnel to transfer user plane data through the core network to a gateway. For example, as shown in FIG. 2, RAB 216 may be established from RAN 210 to SGSN 212 and GTP Tunnel 218 may be established from SGSN 212 to GGSN 214. The shared context may be used to route user data from a packet data network gateway (P-GW) to one or more of Device 1 202, Device 2 204, or Device N 206. Similar to the downlink RAB/PDP context, in the uplink data that is received from multiple devices may be mapped into a shared/common PDP/RAB context in the RAN (e.g., at the base station).

Figure 3:
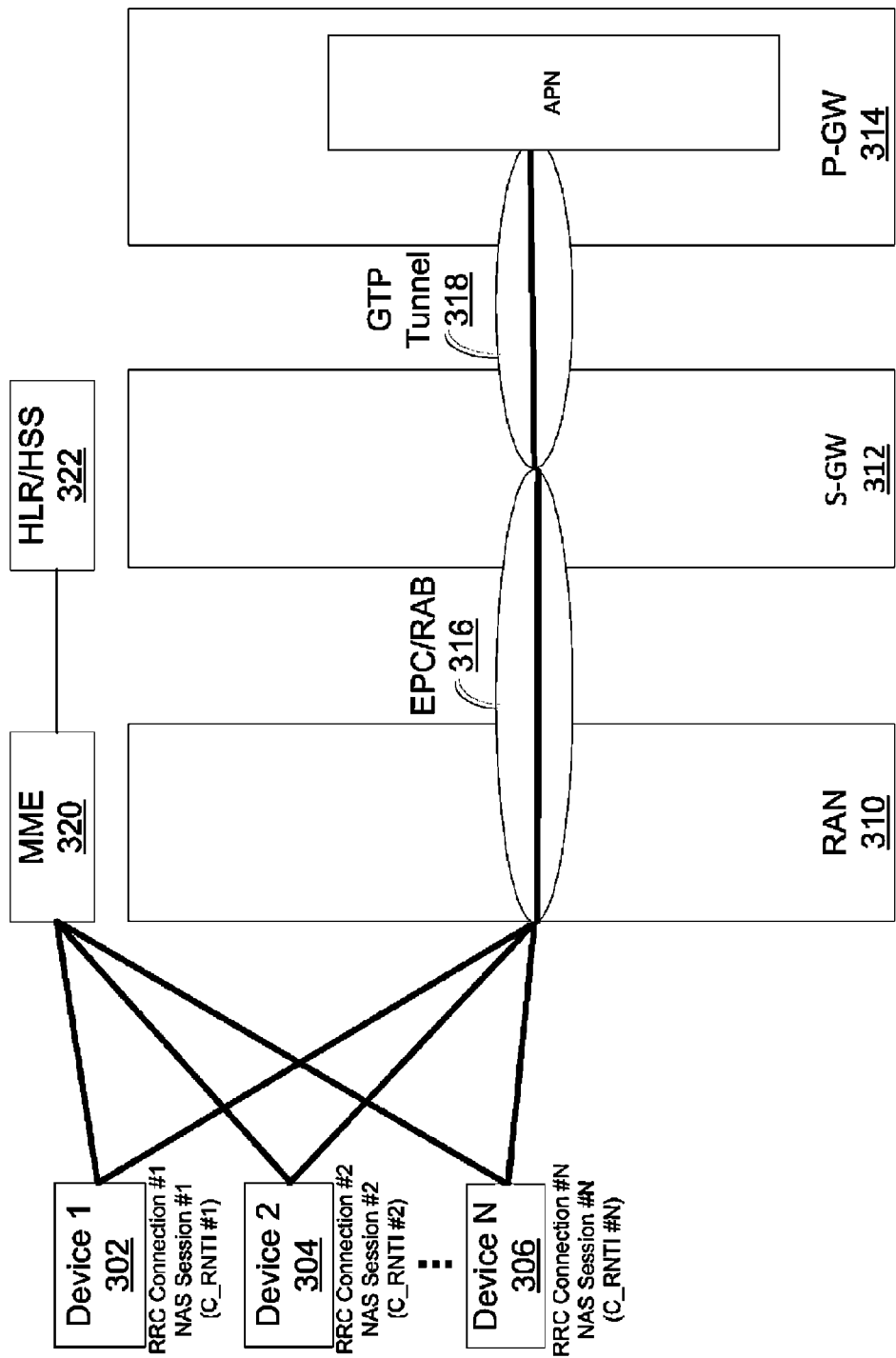
FIG. 3 illustrates an example LTE architecture in which a shared PDP context is employed.

FIG. 3 illustrates the sharing of a PDP context amongst a plurality of devices in an LTE network. For example, FIG. 3 illustrates an E-UTRAN architecture where each device has an individual S1-MME connection to an MME (e.g., MME 320), but shares a common S1-U interface to the P-GW (e.g., P-GW 314). MME 320 may be in communication with home location register (HLR)/home subscriber server (HSS) 322. As shown in FIG. 3, the downlink (and/or the uplink) communication link may be configured to carry data to multiple destinations (e.g., devices) by using a shared EPC RAB/PDP context. For example, Device 1 302, Device 2 304, and Device N 306 may each transmit and/or receive data via an LTE cellular data network. Each device may utilize an individual RRC connection, establish a NAS connection, and/or be associated with a cell radio network temporary identifier (C-RNTI). In order to minimize network overhead associated with the data sent to one or more of the devices, a shared context may be established from a packet gateway (e.g., P-GW 314 214) to RAN 310 (e.g., an eNB—the base station of RAN 310). For example, the RAN may associate each of several radio bearers/RRC connections with a single PDP context. As shown in FIG. 3, EPC/RAB 316 may be established from RAN 310 to S-GW 312 and GTP Tunnel 318 may be established from S-GW 312 to P-GW 314. The shared context may be used to route user data from P-GW to one or more of Device 1 202, Device 2 204, or Device N 206. Similar to the downlink RAB/PDP context, in the uplink data that is received from multiple devices may be mapped into a shared/common PDP/EPC RAB context in the RAN (e.g., at the base station/eNB).

When used herein the term "context" may refer to one or more of the following items associated with a device: a default bearer, one or more dedicated bearers, one or more associated static or dynamic IP address, EPS bearer identity, RAB identifier, UE identifier (SAE Temporary Mobile Subscriber Identity (S-TMSI), MME Temporary Mobile Subscriber Identity (M-TMSI), etc.), EPS Bearer ID (EBI), Linked EPS Bearer ID (LBI), PDP context, and/or the like.

In E-UTRAN, in order to transmit data when a device is in the detached state, an attach procedure is invoked in order to attach to an LTE network. For example, a WTRU may utilize an EPS bearer that is established from WTRU to an exit gateway of LTE core network (e.g., P-GW). In an example, a WTRU may be associated with a single default bearer per PDN. The default bearer may not include QoS treatment and may not utilize traffic flow template (TFT) filters for user data, instead providing basic connectivity between the WTRU and P-GW for a single PDN. The WTRU typically has a single IP address per PDN, and the WTRU obtains an IP address when a default radio bearer is activated. The IP address allocated for the default bearer may be used for the dedicated bearers within the same PDN connection. In many cases, the P-GW acts as a Dynamic Host Configuration Protocol (DHCP) server and assigns a dynamic IP address to the WTRU at the time of default bearer creation. In some P-GW implementations, the P-GW may consult a radius server to allocate IP addresses for use by WTRUs. Dynamic IP address allocation may be carried out during default bearer allocation. The allocated IP address may remain the same and valid for other subsequently added dedicated bearer(s) for that PDN. The WTRU may have a single default bearer and zero or more dedicated bearer(s) per PDN.

For small transmissions, it may be beneficial in some case to have a common EPS bearer, which remains established even when the device detaches. For example, the network may pre-allocate the EPS bearer for a group of devices and may assign the common EPS bearer and IP address to all ATTACH_REQUESTS originating from any of the devices associated with the group.

Figure 4:
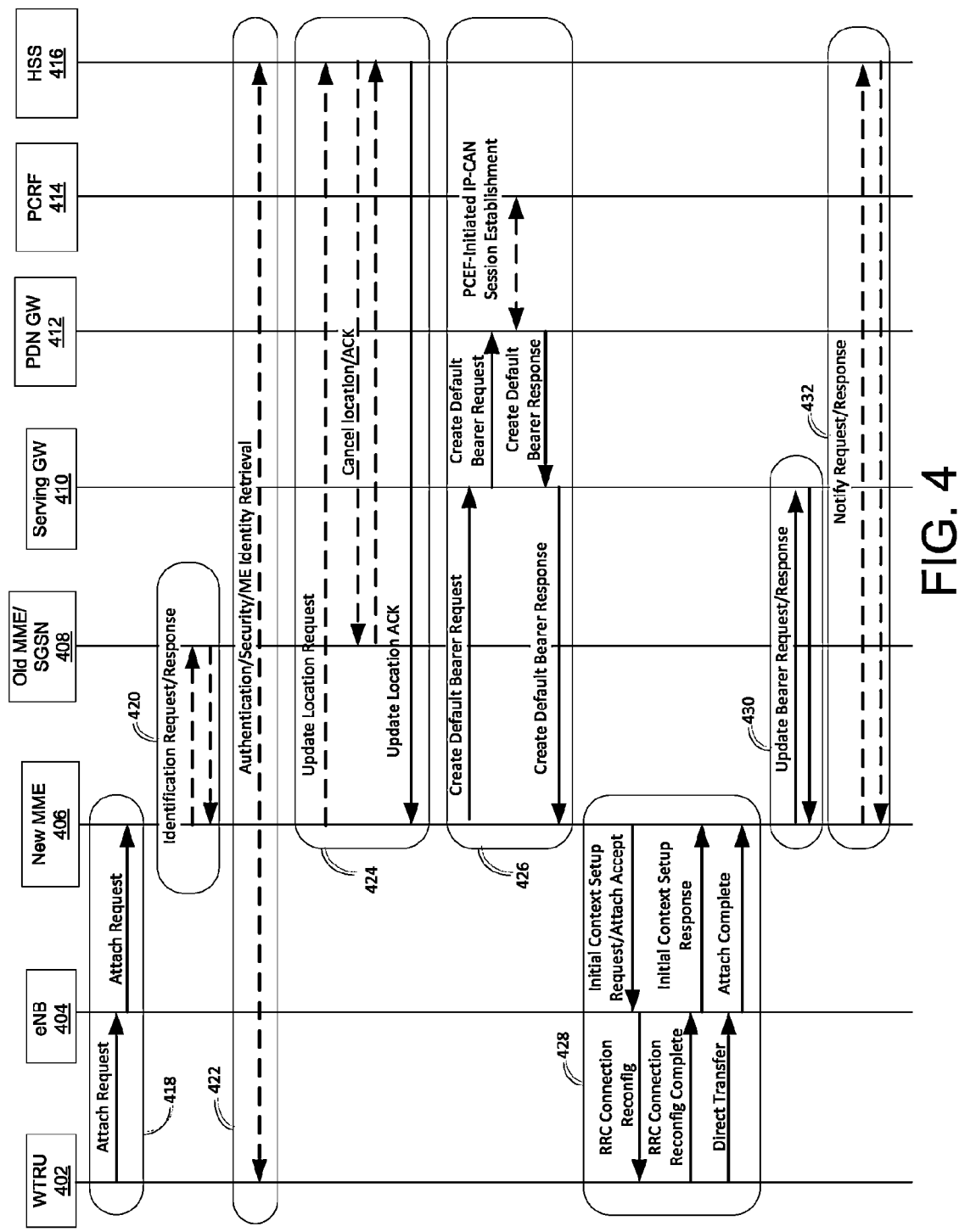
FIG. 4 illustrates an example attach procedure for creation and/or maintenance of a shared PDP context.

FIG. 4 illustrates an example E-UTRAN attach procedure. At 418, WTRU 402 may initiate the Attach Procedure by transmitting an Attach Request to eNB 404. The Attach Request may include one or more of an IMSI, an old global unique temporary identifier (GUTI), a last visited tracking area identity (TAI), a WTRU Core Network Capability, WTRU Specific DRX parameters, an Attach Type, an energy savings management (ESM) message container (e.g., a Request Type, a PDN Type, Protocol Configuration Options, Ciphered Options Transfer Flag), a key identifier (KSI-ASME), a NAS sequence number, a NAS message authentication code (NAS-MAC), an additional GUTI, and/or a P-TMSI signature. eNB 404 may send/forward the Attach Request message together with RRC parameters indicating the Selected Network and the old Globally Unique Mobility Management Entity Identifier (GUMMEI) to New MME 406. eNB 404 may determine the appropriate MME from the RRC parameters carrying the old GUMMEI and the indicated Selected Network. If that MME is not associated with eNodeB 404 or the old GUMMEI is not available, eNodeB 404 may select an MME. eNB 404 may forward the Attach Request message to MME 406 using an S1-MME control message (e.g., an Initial UE message). eNB 404 may forward with Attach Request together with one or more of the Selected Network, a closed subscriber group (CSG) access mode, a CSG ID, a local gateway (L-GW) address, and tracking area identity+E-UTRAN Cell Global Identifier (TAI+ECGI) of the cell that received the Attach Request.

At 420, if WTRU 402 identifies itself with GUTI and the MME has changed since detach, new MME 406 may use the GUTI received from WTRU 402 to derive an address for Old MME/SGSN 408, and send an Identification Request, for example including the old GUTI and the complete Attach Request message, to the Old MME/SGSN 408 to request the IMSI.

At 422, if no UE/WTRU context for WTRU 402 exists within in the network, if the Attach Request was not integrity protected, and/or if an integrity check fails, then authentication and NAS security setup to activate integrity protection and NAS ciphering may be performed. For example, if the temporary ID for WTRU 403 (e.g., GUTI) is unknown to Old MME/SGSN 408 and/or to new MME 406, new MME 406 may request WTRU 402 to send a permanent subscription identity (e.g., IMSI). The MME may check the ME identity with an Equipment Identity Register (EIR). The EIR can be used to blacklist, for example, stolen WTRUs.

At 424, if the MME has changed, New MME 406 may inform HSS 416 that WTRU 402 has moved. HSS 416 may store the MME address for New MME 406 and may instruct Old MME/SGSN 408 to cancel the UE/WTRU context. At 426, a default bearer may be authorized by PCRF 414 and established between Serving GW 410 and PDN GW 412. At 428, the default bearer may be established over the radio interface and the Attach Accept may be sent to the WTRU 402. At 430, New MME 406 may inform Serving GW 410 of the eNodeB Tunnel Endpoint Identifier (TEID), which may complete the setup of the default bearer so that it can be used in both uplink and downlink. At 432, if New MME 406 has selected a PDN GW that is not the same as the one in the received subscription information, it may send a notification of the new PDN GW identity (e.g., the identity of PDN GW 412) to HSS 416.

The association between a policy control and charging (PCC)/QoS rule and a bearer may be referred to as bearer binding. The bearer binding may be performed by the Bearer Binding Function (BBF) which may be located either in the PCEF (for on-path) or in the BBERF (for off-path).

Figure 5:
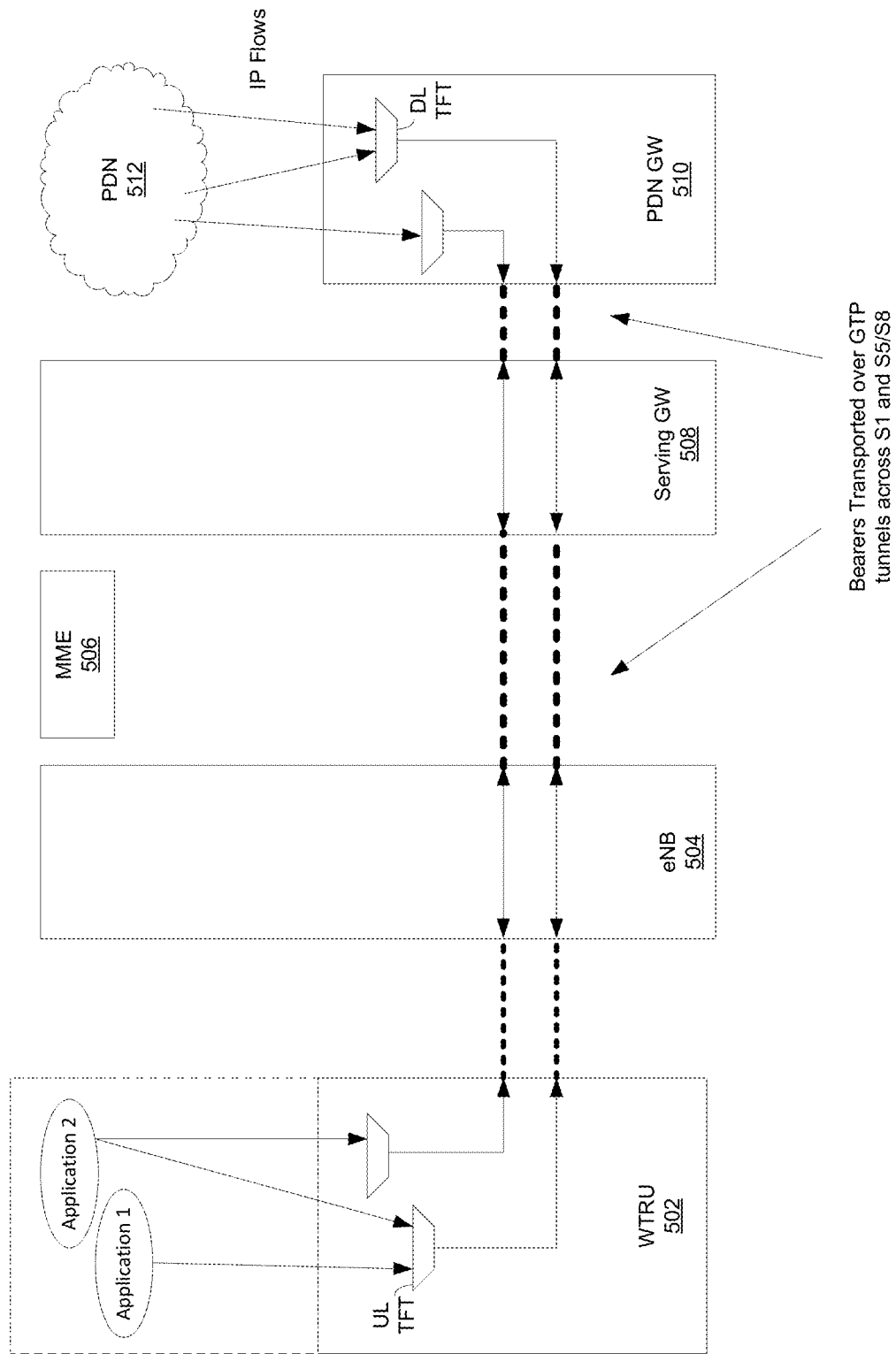
FIG. 5 illustrates example user-plane bearer binding function in an LTE system.

FIG. 5 illustrates an example user-plane bearer binding function in an LTE network. For example, when an EPS bearer is established, a bearer context is created in EPS nodes that handle the user plane data in order to identify each bearer. For E-UTRAN and a GTP-based S5/S8 interface between Serving GW 508 and PDN GW 510, each of WTRU 502, eNB 504, MME 506, Serving GW 508 and PDN GW 510 may establish an associated context for the created bearer. Between the core network nodes in the EPC, the user plane traffic belonging to a bearer may be transported using an encapsulation header (e.g., a tunnel header) that identifies the bearer. The encapsulation protocol may be GTP-U (GTP User Plane). Upon establishment of the EPS bearer, IP Flows from packet data network (PDN) 512 may be routed to WTRU 502 using bearers transported over GTP tunnels across the S1 and S5/S8 interfaces.

Figure 6:
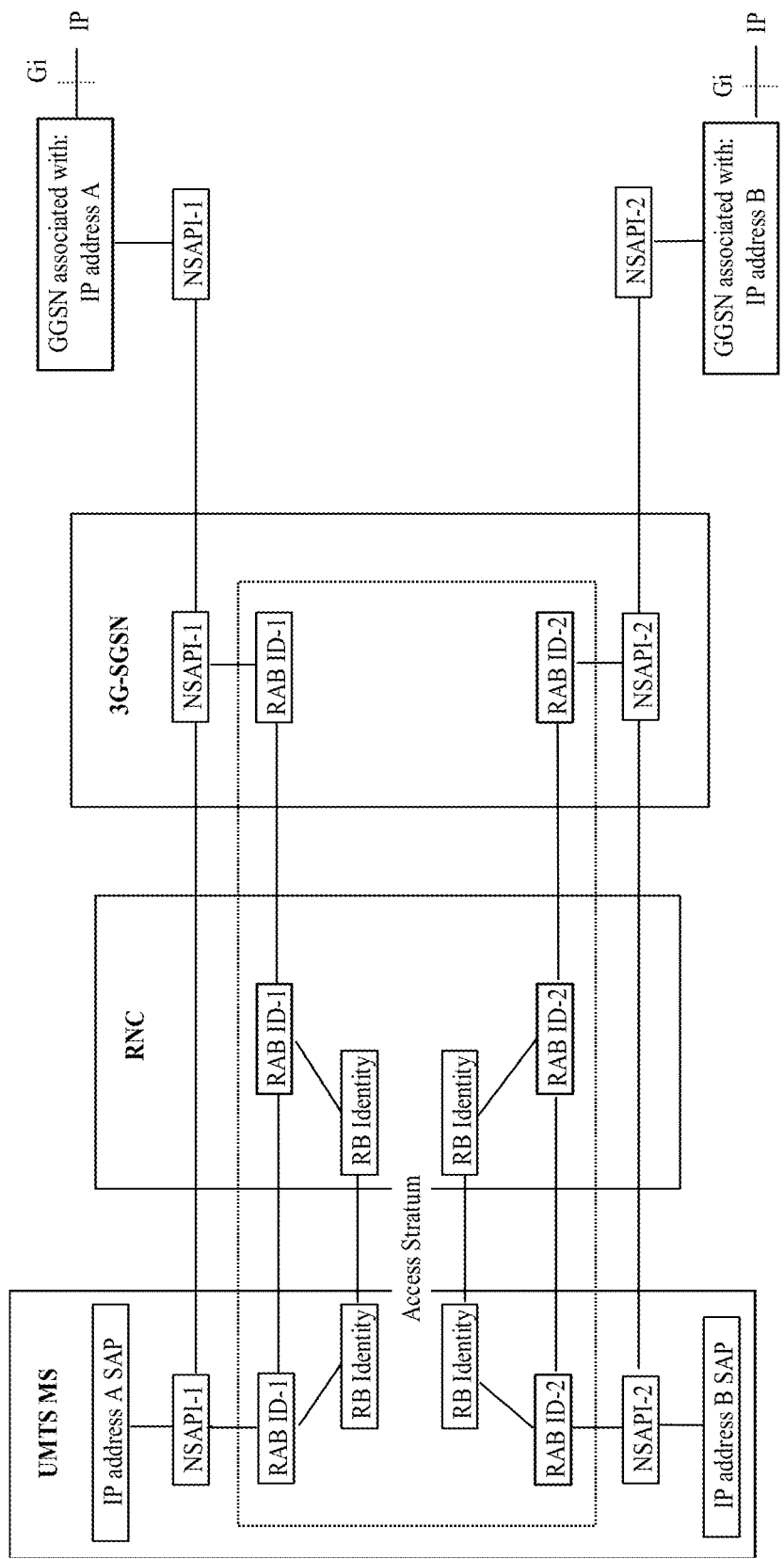
FIG. 6 illustrates example use of Network layer Service Access Point Identifier (NSAPI), radio bearer (RB) Identity, and/or radio access bearer (RAB) IDs for binding in an UMTS system.

FIG. 6 illustrates the use of Network layer Service Access Point Identifier (NSAPI), RB Identity and RAB ID for binding in an UMTS. The PDP context in UMTS may be formed by a RAB plus a GTP tunnel as explained below.

In UMTS the procedure to establish a bearer may be divided into two stages: an attach procedure and a PDP context activation procedure. The Attach procedure in LTE or the PDP Context activation procedure in UMTS may be referred to herein as a "PDN Connectivity establishment" procedure. The NSAPI and IMSI may be used for network layer routing. An NSAPI/IMSI pair may be used to assign a Tunnel Endpoint Identifier (TEID). In the UMTS MS (e.g, a WTRU), the NSAPI may identify the PDP-Service Access Point (SAP). In the SGSN and GGSN, the NSAPI may identify the PDP context associated with an mobility management (MM) context. In the context of this specification, the term RNC may also refer also to a GERAN BSC when serving a WTRU in Iu mode.

In communication with the RNC across the Iu-PS and Uu interfaces, the RAB ID may be used to identify the radio access bearer and the information element used to communicate the RAB ID may be set identical to the NSAPI value.

In the RNC, a RAB ID may identify the RAB context. A Radio Bearer Identity (RB Identity) may be used to identify the Uu interface radio bearer(s) associated with the radio access bearer. The RAB ID may uniquely identify the RAB for a specific CN domain and a particular WTRU.

There may be a one-to-one-to-one relationship between an NSAPI, a Radio Access Bearer, and a PDP context. In the packet domain, there may be a one-to-one relationship with Radio Bearer Identity and the API, a Radio Access Bearer, and a PDP context. The NSAPI may be related to either one IP address or two IP addresses (e.g., one IPv4 address and one IPv6 address if PDP Type IPv4v6 is supported and used).

When the WTRU initiates activation of a PDP context, the WTRU may select one of its unused NSAPIs. When the SGSN initiates a RAB assignment procedure, the SGSN may include the NSAPI(s) in the RAB ID information element(s).

Mutual authentication in E-UTRAN may be based on the fact that both the USIM card and the network have access to the same secret key K. The secret key K may be a permanent key that is stored on the USIM and in the HSS/AuC in network of the home operator. Once configured, the key K remains stored in the USIM or the HSS/AuC.

Figure 7:
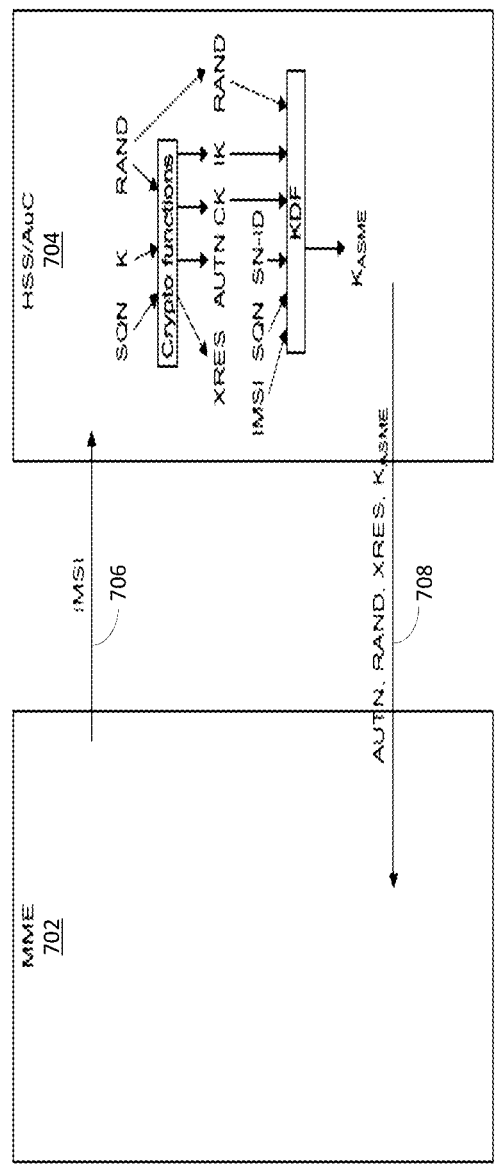
FIG. 7 illustrates an example E-UTRAN Security Key Exchange configuration.

The mechanism for authentication and/or key generation in E-UTRAN may be referred to as EPS Authentication and Key Agreement (EPS AKA). FIG. 7 illustrates an example EPS AKA procedure in an LTE network. EPS AKA may be performed when a WTRU attaches to the EPS via E-UTRAN access. MME 702 may determine the IMSI of the WTRU attempting to attach, and MME 702 may send the IMSI and a request for an EPS authentication vector (AV) 706 to HSS/AuC 704. An EPS master key (KASME), an expected user response (XRES), an authentication token (AUTN) and a random number (RAND) may comprise the EPS AV that is returned to MME 702 in Message 708. The MME may store the KASME and XRES and may forward the RAND and AUTN to the WTRU. Both the RAND and the AUTN may sent to and stored in the USIM. AUTN may be a parameter calculated by the HSS/AuC based on the secret key K and a sequence number (SQN). The WTRU/USIM may calculate its own version of the AUTN using its own key K and the SQN and may compare the result with the AUTN received from the MME. If they are consistent, the WTRU/USIM may determine that the network has been authenticated. Then the WTRU/USIM may calculate a response (RES) using cryptographic functions with the key K and the challenge RAND as input parameters. When the WTRU determines the RES, the control key (CK), and the integrity key (IK) (e.g., from the USIM), the WTRU sends the RES back to the MME. The MME may authenticate the terminal by verifying that the RES is equal to XRES. If so, the MME may determine that the WTRU has been authenticated.

Figure 8:
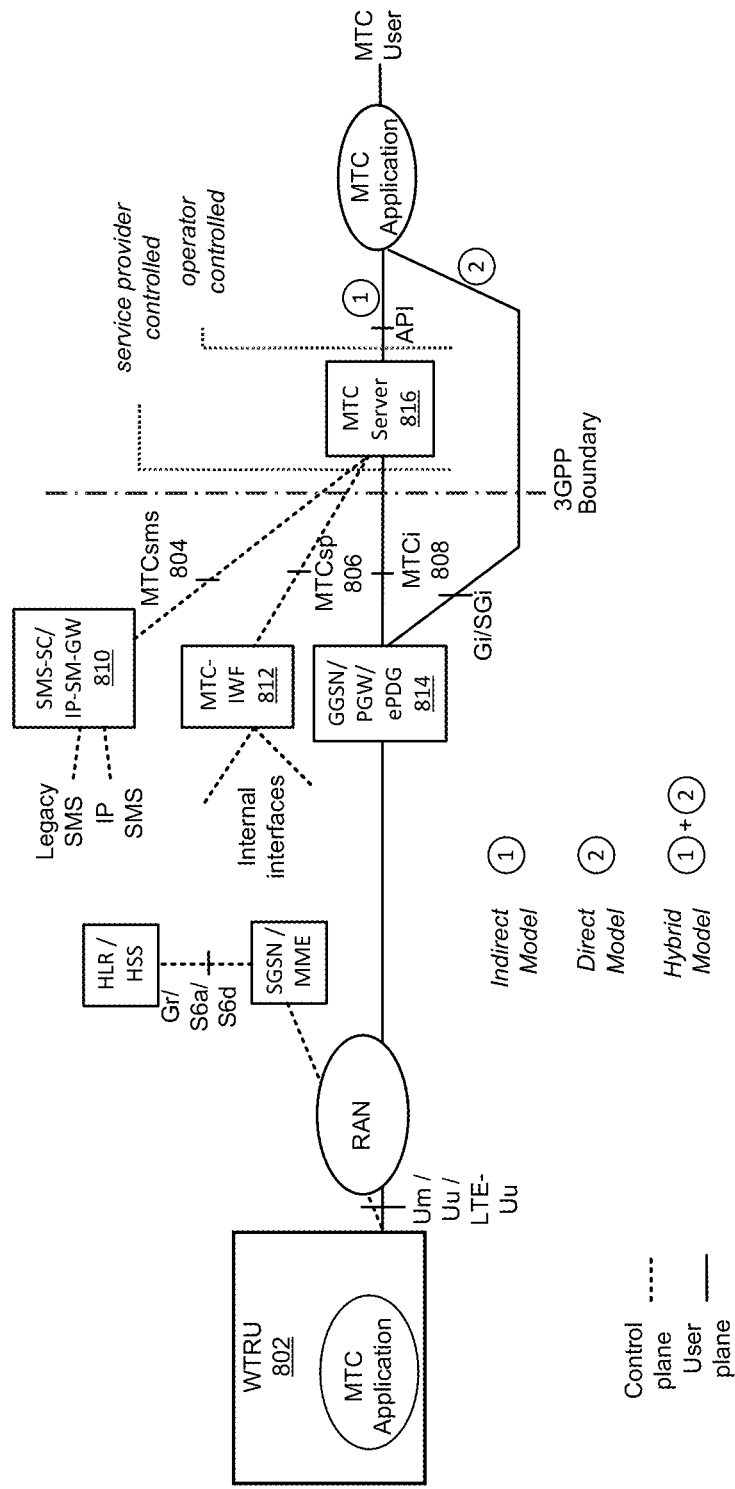
FIG. 8 illustrates an example 3GPP architecture for machine-type communications.

FIG. 8 illustrates an example 3GPP architecture for machine-type communication. The MTCsms interface 804, MTCsp interface 806, and MTCi interface 808 have not yet been fully defined. MTCsms 804 may provide an interface between MTC Server 816 and Short Message Service-Service Center (SMS-SC)/IP Short Message Gateway (IP-SM-GW) 810. MTCsp 806 may provide an interface between MTC Server 816 and MTC-Inter Working Function 812. MTCi 808 may provide an interface between MTC Server 816 and GGSN/PGW/ePDG 814. WTRU 802 may communicate with MTC Server 816, for example via MTCi 808.

Figure 9:
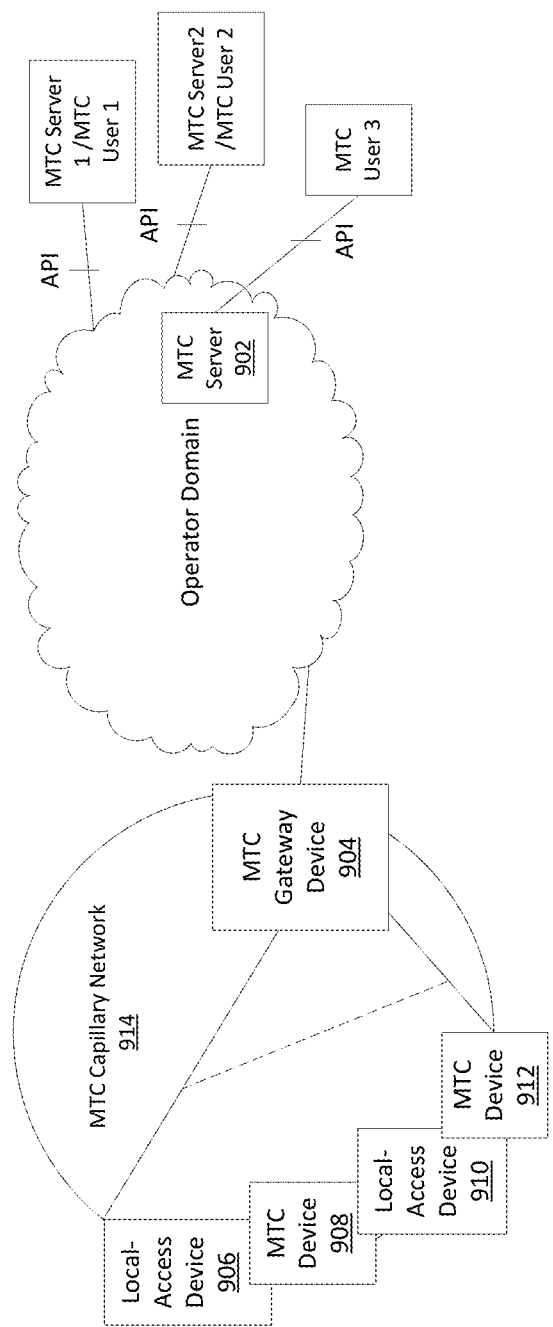
FIG. 9 illustrates an example deployment with an MTC Gateway Device in communication with an MTC server.

Devices from capillary networks (e.g., including non-3GPP devices) may connect to the MTC Server via a gateway either from within the 3GPP network or from some other network such as the internet. FIG. 9 illustrates an example system architecture of a MTC Gateway Device providing MTC Devices within an MTC Capillary Network access to an MTC Server. However, there may be several challenges with regards to the assigning IP addresses to non-3GPP devices that use a WTRU, such as WTRU 802, as a gateway to interface for the 3GPP network and/or an MTC Server. Disclosed herein are several methods for allocating IP addresses to non-3GPP devices by the 3GPP Core Network so that non-3GPP devices may be uniquely addressed by the MTC Server and other devices.

In an example, in order to reduce signaling overhead and prevent potential network congestions, multiple 3GPP devices may share a single PDP context. For example, although each of a plurality of MTC devices/WTRUs may share a single PDP context, each of the plurality of devices/WTRUs may independently execute a separate PDN connectivity establishment procedure. Having each of the MTC device/WTRUs perform a separate PDP connectivity establishment procedure may facilitate backwards compatibility and allow the proposed changes to be implemented in an efficient and cost-effective manner. Backward-compatibility may also include modifications to one or more network procedures, such as RAN procedures and PDN connectivity establishment and release, so as to allow a variety of devices to co-exist in the network.

In order to support a set of MTC devices/WTRUs each registering with the network but sharing a common PDP context, the device PDN Connectivity establishment and release procedures may be updated and refined. For example, the PDN Connectivity establishment and release procedures may be modified to support certain MTC devices/WTRUs being mapped to the same context while still allowing the radio-bearers of other MTC devices/WTRUs to be mapped to a single RAB that is not shared with other devices. Additionally, the PDN Connectivity establishment and release procedures may be modified to support certain groups of MTC devices/WTRUs that experience little or no mobility. For example, if a group of MTC devices is designed as a low mobility group, or if devices belonging to the group do not move much with respect to each other, core network procedures may be optimized with respect to those devices in order to reduce congestion and signaling overhead. For example, location based procedures such as Location Area Updates and/or tracking Area Updates may be optimized for relatively stationary devices and/or devices are relatively stationary with respect to each other.

Furthermore, as noted in with regards to steps 418 and 422 of the LTE Attach Procedure with reference to FIG. 4, a WTRU may identify itself to the network using an International Mobile Subscriber Identity (IMSI), which may be a unique number associated with GSM and UMTS network mobile phone users. For the purposes of scalability and efficient utilization of network resources, in an example each of a "geographically grouped set of devices" may be configured to share a common group identifier. For example, an example group identifier may by a common IMSI that is shared among the group of devices. The common group identifier may be referred to as a Group-ID. The Group-ID may be stored on the USIM of a device. The Group-ID may replace the individual IMSI of the device when the device is identifying itself to the network. If the group of devices sharing a single context is associated with the same Group-ID, additional updates may be implemented so as to allow the network to handle PDN connectivity requests from multiple devices using the same identifier (e.g., Group-ID and/or a common/group IMSI).

Appropriate bearer binding may be carried out in cases where each device uses a unique IP address. Certain existing security procedures may be updated to be able to authenticate multiple devices sharing the same IMSI, if such backward compatibility is desired.

As shown in FIG. 9, many of the devices that connect to the internet via the 3GPP network may connect via gateways. These devices may not be registered or known to the 3GPP core network, and these devices may not even have 3GPP radios. However, an MTC Server may be configured to identify and address the devices that are connected to the MTC Server through the 3GPP network using 3GPP gateways. For example, Local-Access Device 906, MTC Device 908, Local-Access Device 910, and/or MTC Device 912 may each communicate with MTC Server 902, for example via MTC Gateway Device 904. MTC Gateway Device 904, Local-Access Device 906, MTC Device 908, Local-Access Device 910, and/or MTC Device 912 may form MTC Capillary Network 914. MTC Gateway Device 904 may be a 3GPP subscriber and may be a WTRU. MTC Gateway Device 904 may be configured to provide Local-Access Device 906, MTC Device 908, Local-Access Device 910, and/or MTC Device 912 access to MTC Server 902 via the 3GPP network. Local-Access Device 906, MTC Device 908, Local-Access Device 910, and/or MTC Device 912 may be non-3GPP devices. MTC Server may be configured to identify and address one or more of Local-Access Device 906, MTC Device 908, Local-Access Device 910, and/or MTC Device 912 even if they non-3GPP device that are connected through the 3GPP network. To allow for such functionality, the 3GPP network may be configured to allocate unique IP addresses for the devices that connect from behind 3GPP gateways (e.g., such as MTC Gateway Device 904).

The devices that connect to the internet via 3GPP gateways may be referred to as capillary network devices. Capillary network devices may be low resource devices that infrequently transmit and receive small amounts of data. These low resource capillary network devices may be referred to as D' (d-prime) devices. In an example, capillary network devices may be higher end devices that transmit and receive data at higher data rates (e.g., cameras that stream video). Capillary networks may, or may not, be private from the 3GPP network.

Currently, a separate PDP context is established for each IP connection. With respect to MTC devices and other devices that transit small amounts of data established in separate PDP context for each IP connection may be suboptimal. For example, the amount of data generated by each MTC Device may be much smaller than the amount of signaling required to create a new PDP context. Thus, the signaling overhead currently associated with assigning an IP address to every low resource device may be unacceptable from the perspective of the network.

Figure 10:
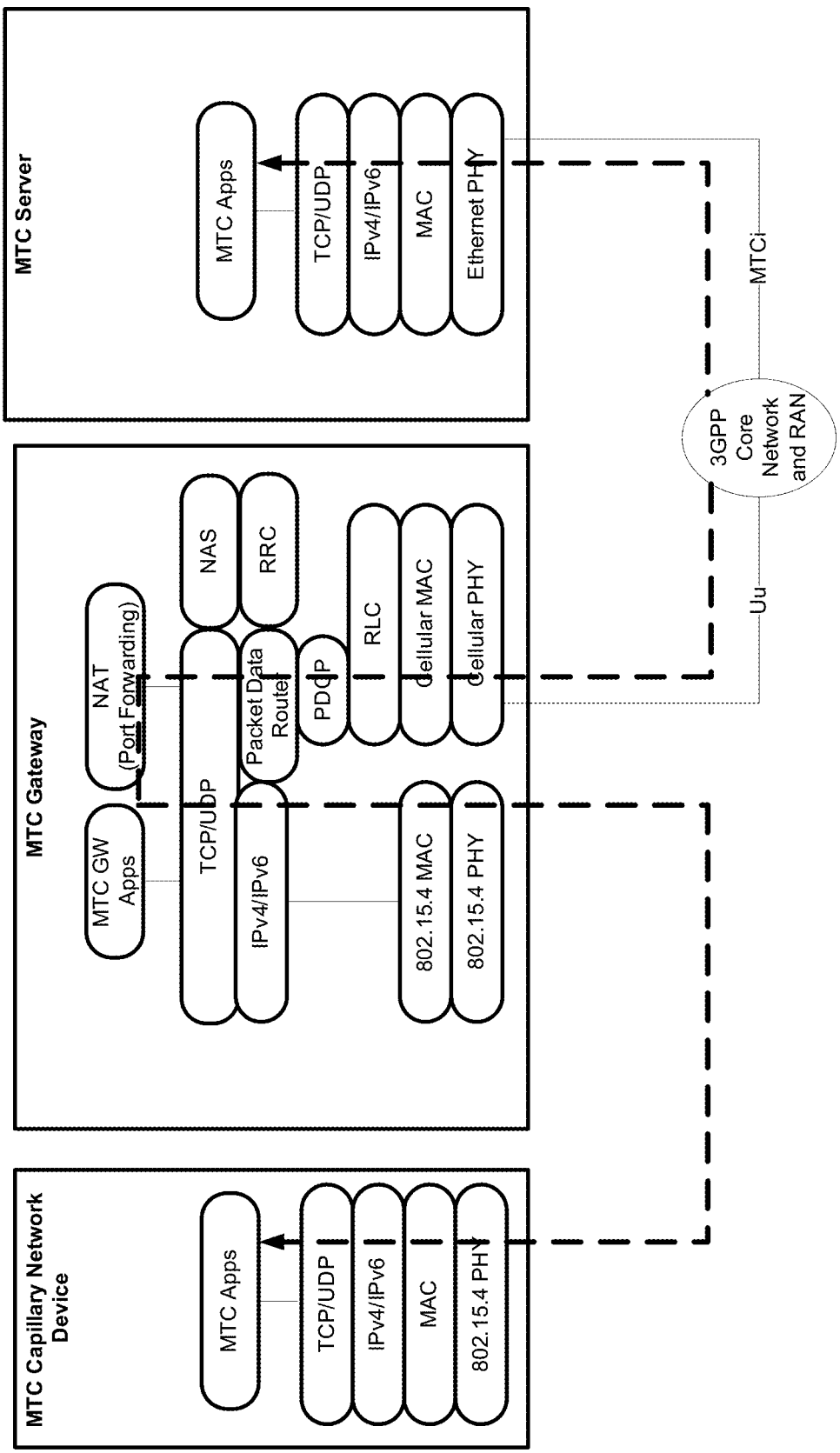
FIG. 10 illustrates example communication protocol stacks for use with gateway port forwarding.

For example, consider the case where there are many low-resource devices accessing the 3GPP network via a 3GPP gateway. The 3GPP GW may establish a single PDP context and map data from all capillary network applications onto the same PDP context/IP address. Each capillary network device may be mapped to separate port(s) at the IP address of the 3GPP gateway. The GW may use port forwarding to direct each IP packet to the correct destination. FIG. 10 illustrates example signal flow through multiple communication protocol stacks for establishing a single PDP context and mapping data from all capillary network applications onto the same PDP context/IP address using port forwarding. Utilization of port forwarding at a gateway may facilitate the use of a single shared PDP context among a plurality of devices. For example, the 3GPP GW may support port forwarding capabilities. When utilizing the port forwarding approach, MTC Server may map external identifiers of the capillary network devices to an IP address and port number.

Figure 11:
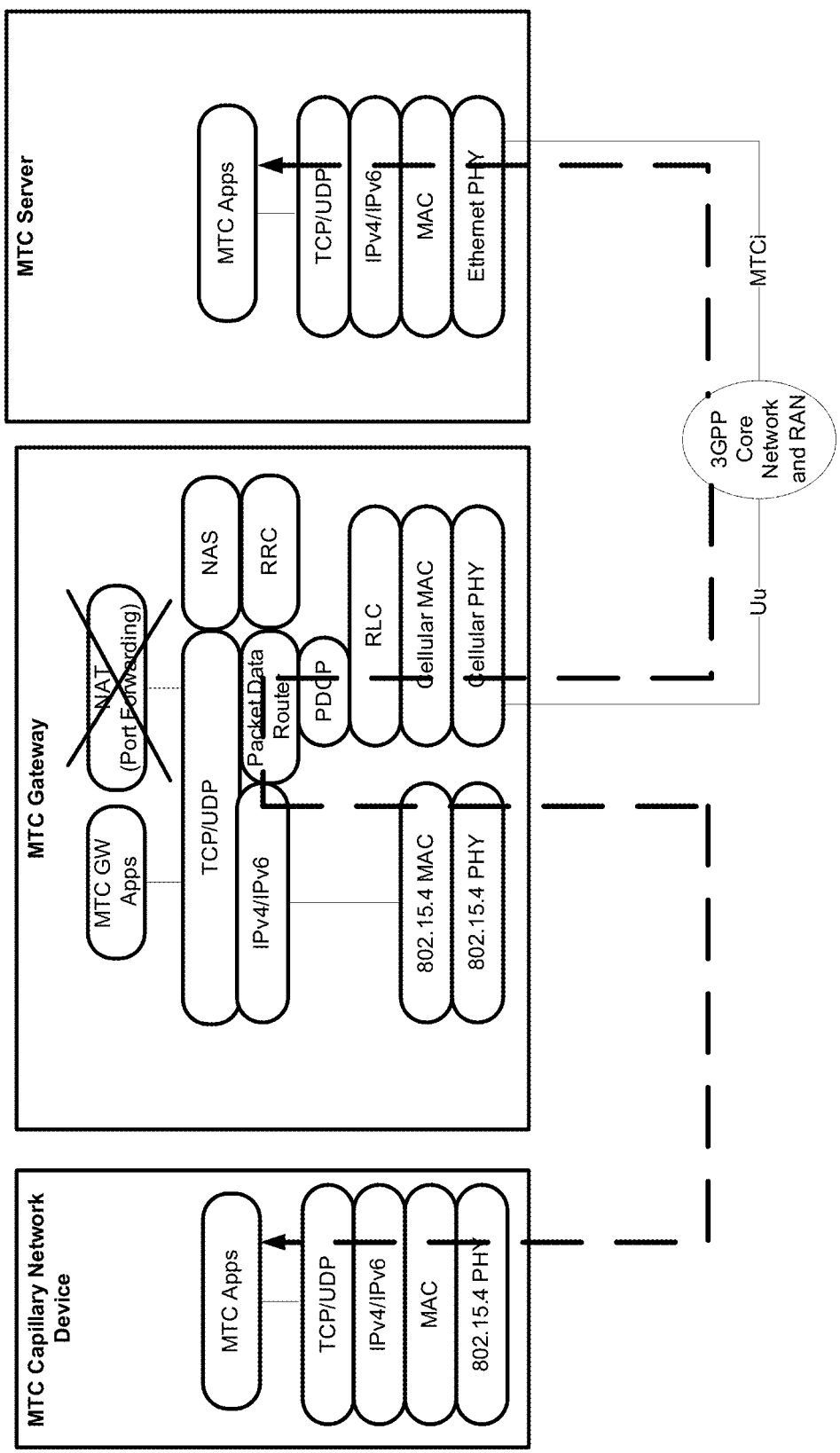
FIG. 11 illustrates example communication protocol stacks for use with a gateway acting as a router.

In scenarios where IPv6 is used in the CN, it may be reasonable to assign multiple IP addresses to each device in a GW/Capillary Network. For example, with a single GW, M capillary networks, and N capillary network devices (where M and N are integers), the core network may assign 1+M+N IP addresses to the gateway. The GW may then associate a separate IP address with each capillary network device and use one IP address for each of its physical interfaces. This approach would avoid the need for port forwarding rules to be established, thus reducing signaling towards the MTC Server. Such an approach may also avoid the use of for complicated network address translation functionality in the 3GPP GW. FIG. 11 illustrates example signal flow through multiple communication protocol stacks for establishing multiple IP addresses for a plurality of devices with a capillary network.

As maybe appreciated, if a single IP address is associated with each PDP context, it may be very inefficient for the 3GPP GW to establish a separate PDP context for each device to be assigned its own IP address, for example in scenarios where one or more devices generate small amounts of data. The associated signaling overhead for establishing the PDP contexts may be greater than the data to be transmitted. However, sharing a PDP context and a single IP address may in turn require more NAT functionality. Thus, methods and systems are disclosed for allowing multiple IP addresses to be assigned to a single PDP context.

Note that FIG. 10 and FIG. 11 illustrate that the connection between the capillary network and MTC Gateway may be provided via an IEEE 802.15.4 physical interface. The use of an IEEE 802.15.4 interface is an example, and other physical interfaces may be used, for example 802.11. In fact, the capillary network may use an addressing protocol that is different than IP addressing. For example, the GW may perform a mapping between IP addressing and the addressing scheme that is used in the capillary network.

In an example configuration, one or more devices that share a PDP context with another device, for example MTC devices and/or MTC gateway devices, may be configured to use backward compatible RAN procedures to initiate an individual RRC connection to the network. For example, the devices that share the PDP context may send individual attach messages to the network. The network may recognize that one or more of the devices are members of the group of devices that shares a common PDP context and may take appropriate action to establish the connection. Core network procedures may be configured to map the devices as part of the group and/or to perform appropriate bearer binding for associating individual device/WTRU radio bearers with the shared context.

In an example, the core network may maintain a count of the number of devices that belong to the same group. For example, when the first device attaches to an LTE network, the core network may accept the PDN connectivity request and/or may initiate core network procedures for establishing security, authentication, and/or default context creation. When subsequently another device that is also a member of the same group attempts to attach to the core network, the core network may identify that the subsequently connecting device has been pre-registered, and may forgo one or more core network procedures for the second device (e.g., security, authentication, and/or default context creation). For example, in LTE the MME may send the Initial Context for the device with the shared PDP context information (e.g., EPC context information) to the eNB. When the first device in the group attempts to attach to the network, the network may perform default bearer setup for the first device. For each of the devices in the group that subsequently attempt to attach to the network, the Attach Accept sent to the subsequently attaching devices may include with the same PDP context information (e.g., EPS bearer context) as was provided for the first device that attached for the group. In an example, location area/tracking area update procedures may be performed for a single device (e.g., the first device) in a group to trigger a location updating procedure, but may be skipped for other devices in the group. In an example, when the final device in the group with the shared PDP context releases PDN connectivity from the network, the network may release the group resources.

In an example, when the group subscription for the shared PDP context (e.g., EPS bearer and/or context) and/or for a predetermined service request (e.g., certain service(s) may be mapped to a preconfigured EPS bearer) is established, the shared context may be preallocated for the MTC group. The preallocated shared context may be used by an eNB for each attach request originating from a member of the MTC group.

In an example, a core network element (e.g., an MME/SGSN) may maintain a count of the number of and/or identity of devices that are part of a common group/service/traffic type. The core network element (e.g., the MME/SGSN) may dynamically transitions from using a single context per device to a using a shared context based on predefined criteria. For example, if the count of the number of devices that are part of the group exceeds a predetermined threshold, core network element (e.g., the MME/SGSN) may transition individual contexts that were established for group members to a single shared context. For example, the established device contexts may be reconfigured with new bearer binding information, IP address information, and/or context information for the shared context.

In an example, appropriate procedures for routing packets to individual devices may be modified in order to support routing to/from a group of devices share a common context. For example, procedures for bearer binding and IP addressing may be established/modified to facilitate the proper routing and/or delivery of packets where an EPS default bearer context is associated with a single static and/or dynamic IP address. For example, one or more translation functions may be used at an RNC/eNB and/or at a GGSN/P-GW to enable the use of individual IP addresses for each device sharing a single context/default context.

In an example, a group identifier such as a Group-IMSI may be established for jointly identifying members of a shared context group. If such a group identifier is used, the security and/or authentication procedures may be updated in order to ensure proper authentication and/or key exchange for the devices sharing the group context.

In an example, a cellular GW such as an MTC gateway device may request that multiple IP addresses be associated with the same PDP context. The IP addresses may be used for routing packets to and/or from a capillary network. The GW may perform Layer 3 (L3) routing on IP packets that are sent to/from the capillary network. Spare bits included in existing PDP Context Activation and/or PDP Context Modification information elements may be utilized for requesting and/or allocating the multiple IP addresses. Such an approach may be backwards compatible and may be utilized in accordance with procedures for existing devices.

By allowing a device, for example an MTC gateway device, to request multiple IP addresses for a single shared context, the core network may obtain greater knowledge regarding the identity, number of, capabilities of, and/or type of non-3GPP devices that obtain connectivity through the 3GPP network through a connection established using a capillary network. For example, the network may be able to determine the number of a devices connecting through the GW, and then may charge the subscription associated with the gateway based on the learned information (e.g., based on the number of IP addresses allocated to the GW).

Figure 12:
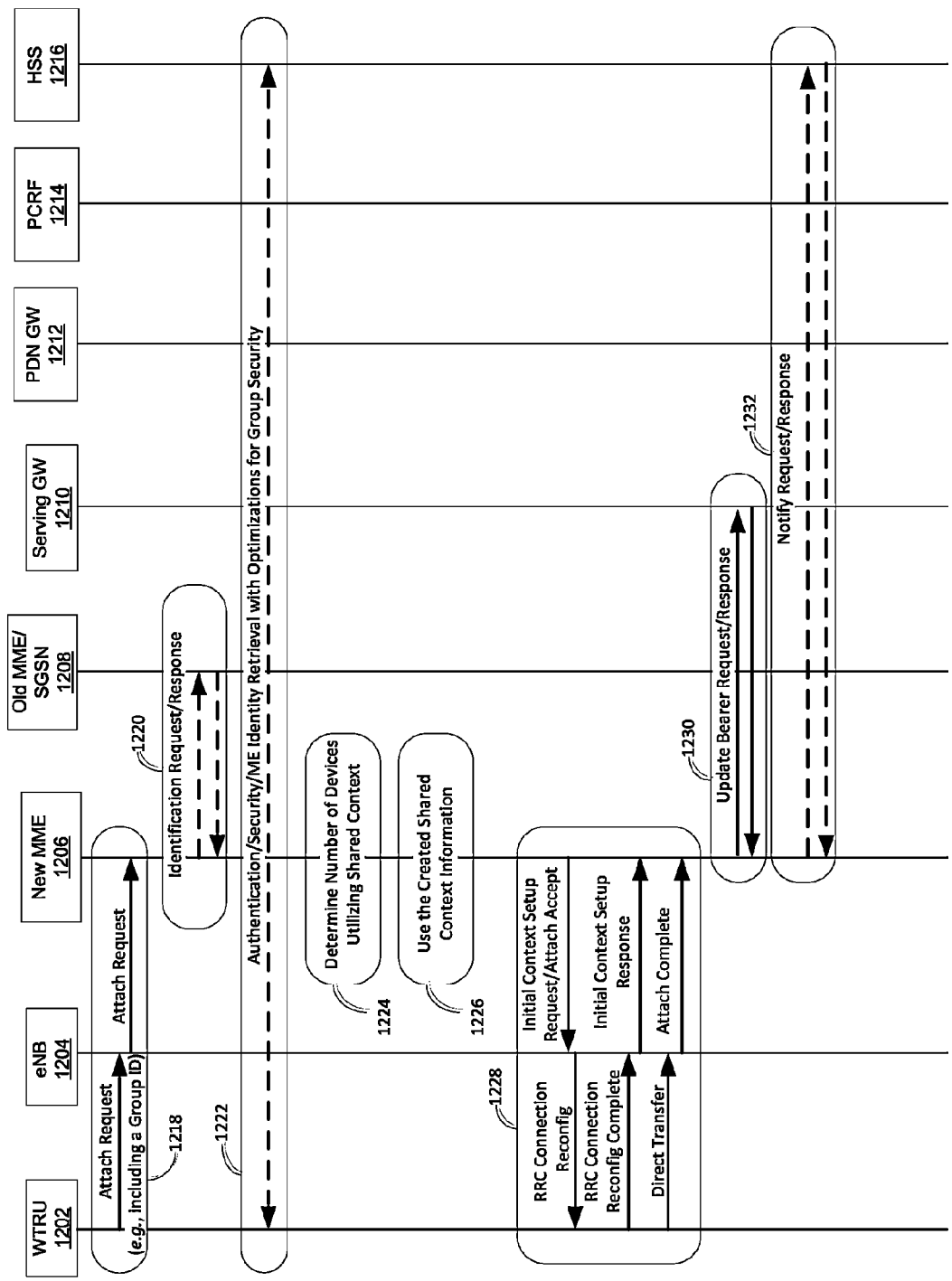
FIG. 12 illustrates another example attach procedure for creation and/or maintenance of a shared PDP context.

FIG. 12 illustrates an example attach procedure that may be used by subsequent group member that are attaching to the network using a previously created shared context. For example, location update procedures and/or create default bearer procedures (e.g., 424 and/or 426 of FIG. 4) may be omitted during an attach procedure for a subsequent group member performing a PDN connectivity request after the first group member has established the PDN context. Instead, the MME and/or SGSN may use the created shared information to establish a connection for the subsequent device using the previously created shared context. In an example, the MME and/or the SGSN may maintain a counter (e.g., a GROUP_COUNT) that may be updated each time an Attach and/or Detach request occurs.

For example, at 1218, WTRU 1202 may initiate the Attach Procedure by transmitting an Attach Request to eNB 1204. WTRU 1202 may be a member of a group that shares a common PDP context. WTRU 1202 may indicate that it is a member of the group in the attach request. For example, WTRU 1202 may include a Group ID for the group sharing the context in the Attach Request. In an example, a new establishment cause, for example MTC_ATTACH, GROUP_ATTACH, and/or SERVICE_ATTACH, may be utilized to distinguish the Attach request. For example, a MTC_ATTACH request may include additional IEs that identify and/or provide information regarding MTC device specific features being supported. In an example, a GROUP_ATTACH request may indicate that the attaching device is part of a group and may share a common context and/or IMSI.

The Attach Request may include one or more of an IMSI, an old GUTI, a last visited TAI, a WTRU Core Network Capability, WTRU Specific DRX parameters, an Attach Type, an ESM message container (e.g., a Request Type, a PDN Type, Protocol Configuration Options, Ciphered Options Transfer Flag), a KSIASME, a NAS sequence number, a NAS-MAC, an additional GUTI, a P-TMSI signature, and/or a Group ID. eNB 1204 may send/forward the Attach Request message together with RRC parameters indicating the Selected Network and the old GUMMEI to New MME 1206. eNB 1204 may determine the appropriate MME from the RRC parameters carrying the old GUMMEI and the indicated Selected Network. If that MME is not associated with eNodeB 1204 or the old GUMMEI is not available, eNodeB 1204 may select an MME. eNB 1204 may forward the Attach Request message to MME 1206 using an S1-MME control message (e.g., an Initial UE message). eNB 1204 may forward with Attach Request together with one or more of the Selected Network, a CSG access mode, a CSG ID, a L-GW address, and TAI+ECGI of the cell that received the Attach Request.

At 1220, if WTRU 1202 identifies itself with GUTI and the MME has changed since detach, new MME 1206 may use the GUTI received from WTRU 1202 to derive an address for Old MME/SGSN 1208, and send an Identification Request, for example including the old GUTI and the complete Attach Request message, to the Old MME/SGSN 1208 to request the IMSI.

At 1222, authentication/security/ME identity retrieval with optimizations for group security may be performed. For example, one or more security, identification, and/or authentication procedures may be modified to account for the use of a shared group context. Specific changes are discussed in more detail below. NEW MME 1206 may recognize that the member of the attaching device is a member of a shared context group, for example based on the attach request. In an example, if no UE/WTRU context for WTRU 402 exists within in the network, if the Attach Request was not integrity protected, and/or if an integrity check fails, then authentication and NAS security setup to activate integrity protection and NAS ciphering may be performed. For example, if the temporary ID for WTRU 1202 (e.g., GUTI) is unknown to Old MME/SGSN 1208 and/or to new MME 1206, new MME 1206 may request WTRU 1202 to send a permanent subscription identity (e.g., IMSI). MME 1206 may request WTRU 1202 to send a group subscription identity (e.g., Group-IMSI). The MME may check the ME identity with an EIR. The EIR can be used to blacklist, for example, stolen WTRUs.

At 1224, New MME 1206 may determine that WTRU 1202 is a member of a group that shares a PDP context, for example based on information included in the attach request (e.g., a Group ID). New MME 1206 may maintain a counter (e.g., a GROUP_COUNT) in order to determine the number of devices sharing a common context. For example, upon receiving the attach request including the Group ID, New MME 1206 may increment the GROUP_COUNT associated with that Group ID. If another device associated with the Group ID had previously attached to the network, then MME 1206 may determine to refrain from performing a location updating procedure, for example if the location update procedure had been previously triggered and/or performed for another member of the group that had previously attached.

At 1226, New MME 1206 may determine default bearer information for WTRU 1202. For example, New MME 1206 may allow WTRU 1202 to use a shared default bearer that had previously been created for the group that includes WTRU 1202. For example, the shared default bearer may have been previously authorized by PCRF 1214 during a previously performed attach procedure that was performed for another member of the group. The shared default bearer may have been established between Serving GW 1210 and PDN GW 1212. MME 1206 may determine the identity of the shared default bearer based on information included in the attach request, for example based on the Group ID.

At 1228, the shared default bearer may be established over the radio interface and the Attach Accept may be sent to the WTRU 1202. At 1230, New MME 1206 may inform Serving GW 1210 of the eNodeB Tunnel Endpoint Identifier (TEID), which may complete the setup of the shared default bearer so that it can be used by WTRU 1202 in both uplink and downlink. At 1232, if New MME 1206 has selected a PDN GW that is not the same as the one in the received subscription information, MME 1206 may send a notification of the new PDN GW identity (e.g., the identity of PDN GW 1212) to HSS 1216.

The association between a policy control and charging (PCC)/QoS rule and a bearer may be referred to as bearer binding. The bearer binding may be performed by the Bearer Binding Function (BBF) which may be located either in the PCEF (for on-path) or in the BBERF (for off-path).

In an example, in order to differentiate whether individual PDN connectivity requests are to be processed individually or are to be processed as part of a common group/service/pool, each device in a shared context group may sends the individual IMSI of the device and/or an additional IE that indicates the Group ID of the shared context group. The Group ID may be included in the Attach Request and/or other PDP connectivity request messages. Additional security procedures may be used to protect the transmission of the Group ID in the PDN connectivity request message.

In an example configuration, an association of an IMSI with a shared context group may be stored with the subscription information for the WTRU, for example in the HSS/HLR. A MME and/or SGSN may receive an indication from the HSS/HLR that a given device and/or IMSI is a member of the shared context group. The MME and/or SSGN may determine that one or more devices are same group the HSS/HLR sends the same Group ID for each of the devices and/or if each of the devices include the same Group ID in the PDP connectivity request message. The MME and/or SGSN may use the indication that the devices have the same Group ID to associate each of the devices with a shared EPC bearer (e.g., PDP context).

For user-plane traffic forwarding, the network may perform bearer/context binding where all of the devices in a shared context group share the same IP address. If each of the devices in the shared context group shares a single IP address, one or more of the following procedures may be implemented in any combination.

For example, when one or more devices of the group requests PDN connectivity from the network, an RNC, an SGSN, and/or an eNB may determine and obtain the appropriate common/shared context for the shared context group. The RNC, SGSN, and/or eNB may create a mapping for individual radio bearers that are associated with the single shared context. The shared context may share a common IP address, which for example may be a multicast IP address. In an example, downlink data to be delivered to one or more devices in the shared context group associated with the common context may be sent to all the devices in the shared context group. For example, application level processing at the devices of the shared context group may then determine if the downlink data was intended for the individual device. For example, each device may be associated with separate application-level identifiers that may be used to determine if a received message, such as a multi-cast message, was intended for the individual device. In the uplink, data from any of the devices in the shared context group may appear to the RNC and/or eNB as being sent from the same source IP address. Similar to the downlink, an application level identifier may be used to differentiate which member of the shared context group sent the uplink transmission.

In an example, each of the devices in a shared context group may share the same IP address, the RNC, SGSN, and/or eNB may perform additional mapping to identify the identity of the shared context group member that sent and/or receiver one or more messages. Such mapping may also be performed at the P-GW and/or GGSN. For example, the destination (e.g., downlink) and/or source (e.g., uplink) of a message addressed to/by the IP address shared by a shared context group may be determined by hashing the port number indicated by the message with a unique device identifier, such as an user account number. The eNB/RNC/SGSN (e.g., for uplink transmissions) and/or P-GW/GGSN (e.g., for downlink transmissions) uses the hash function to identify the individual device and/or may removes the hash to deliver the original packet to the device.

Figure 13:
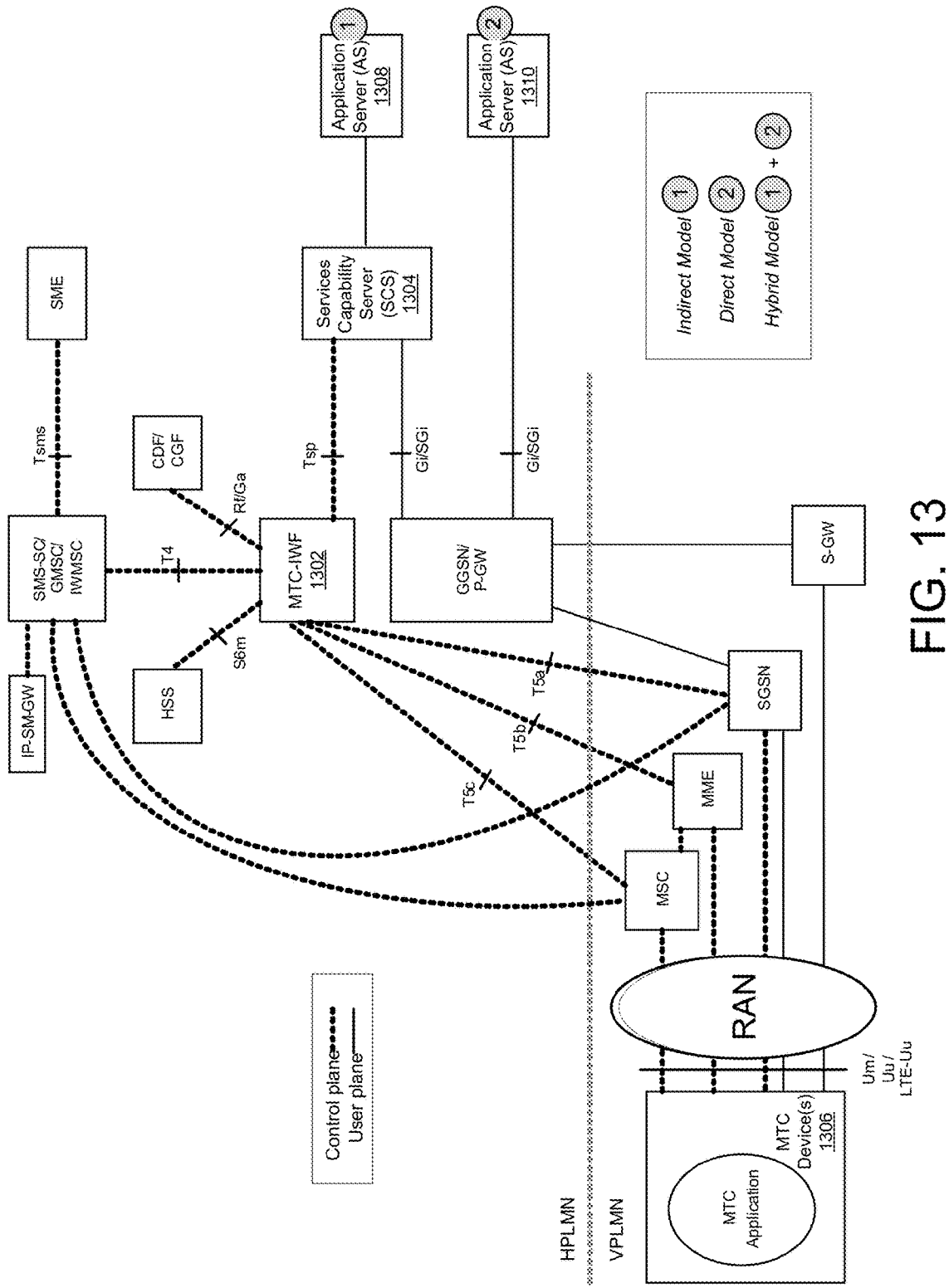
FIG. 13 illustrates an example architecture including a MTC-IWF configured to interface between a MTC server and the core network.

FIG. 13 illustrates an example architecture that includes a MTC interworking function (MTC-IWF) for use in a 3GPP network. In an example, a MTC-IWF may form an interface between an MTC server/a server managing/controlling MTC operation and a 3GPP core network. For example, as shown in FIG. 13, MTC-IWF 1032 may provide an interface for control data to be exchanged between a Services Capability Server (SCS) 1304 and the core network. AS 1308 and/or AS 1310 may be examples of MTC applications. MTC severs may include MTC applications. Services Capability Server (SCS) 1304 may be an example of an MTC Server. SCS 1304 may provide additional MTC services between the core network, MTC-IWF 1302, AS 1308, and/or AS 1310.

The end-to-end communications, between MTC Application(s) executed on MTC device(s) 1306 and the MTC Application in the external network (e.g., MTC applications executed on AS 1308, AS 1310, and/or SCS 1304), may use services/communication links provided by the 3GPP system and/or services provided by Services Capability Server (SCS) 1304. Although FIG. 13 illustrates that an MTC Application in the external network is hosted by an Application Server (AS) (e.g., AS 1308 and/or AS 1310), the MTC Application may be hosted on other nodes or servers. The 3GPP system may provide transport and communication services that include various architectural enhancements. For example, MTC-IWF 1320 and/or SCS 1304 may provide control plane device triggering for MTC communications. Triggering may refer to sending an indication to the MTC device to activate or form a connection to the 3GPP core network.

MTC-IWF 1302 may facilitate operable communication between MTC applications. In an example, MTC-IWF 1032 may perform a group identifier mapping such that a trigger request may be made for a group identifier. The trigger request may be associated with a group of MTC Device(s) 1306 and a common group IP address or a group of IP addresses. For example, AS 1308, AS 1310, and/or SCS 1304 may determine to communicate with one or more of MTC Device(s) 1302. However, if the one or more MTC Device(s) 1302 are not current connected to the network, MTC Device(s) 1302 may not be associated with an IP address(es) and may be unreachable via standard IP communication. The MTC-IWF may determine that a trigger request (e.g., a request to connect to the network) should be sent to MTC Device(s) 1302 based on a group identifier that is received from 1308, AS 1310, and/or SCS 1304. MTC-IWF 1302 may indicate in the trigger message that the group of devices should share a PDP context. MTC-IWF 1302 may determine the common group IP address or a group of IP addresses based on the received group identifier.

Several example models/techniques are contemplated for machine type of traffic to be communicated from MTC Device(s) 1306 and between the SCS 1304 and AS 1308/1310 using the 3GPP network. For example, in a Direct Model the AS (e.g., AS 1310) may connect directly to an operator network in order to perform direct user plane communications with a MTC device (e.g., MTC Device(s) 1306) without the use of a SCS (e.g., SCS 1304). In an indirect model, the AS (e.g., AS 1308) may connect indirectly to the operator network in order to utilize services of SCS 1304. SCS 1304 may facilitate indirect user plane communications a MTC device (e.g., MTC Device(s) 1306) and may provide additional value added services, for example control plane device triggering. SCS 1304 may be controlled and/or operated by an MTC service provider and/or by the operator of the 3GPP network. If the SCS is controlled by a MTC service provider, then SCS 1304 may be an entity outside of the operator domain and the Tsp may be an external interface between the 3GPP core network and a third party MTC service provider. If the SCS is an entity inside the operator domain, Tsp may be an interface that is internal to the PLMN. In a hybrid model, AS 1308/1310 may use the direct and indirect models simultaneously in order to connect directly to the operator's network to perform direct user plane communications with an MTC device while also utilizing an SCS for additional services.

From the perspective of the 3GPP network, direct user plane communication from an AS and control plane related communications to/from an SCS may be independent. Thus, the hybrid model may be utilized in order to facilitate direct user plane traffic and indirect control plane traffic which utilizes additional services provided by an SCS. It is contemplated that the different models (e.g., direct model, indirect model, and/or hybrid model) may not be not mutually exclusive, and/or may be complimentary. Therefore, it is contemplated that a 3GPP operator may combine one or more of the architectures for different applications. Such a combination may include a combination of both an MTC Service Provider and the 3GPP network operator controlled SCSs communicating with the same PLMN. Although FIG. 13 may illustrate an example roaming case where MTC communications are communicated between a visited public land mobile network (VPLMN) and a home public land mobile network (HPLMN), as may be appreciated, in the non-roaming case the VPLMN and the HPLMN may be the same PLMN.

In some examples configurations, one or more devices sharing a common PDP context may be assigned individual IP address for use over the common context. In other words, the IP address assignment procedure may be designed such that the MME and/or SGSN may assign individual IP addresses to group members utilizing a single shared PDP context. For example, the MME and/or SGSN may determine or obtain a list of IP addresses, an IP address pool, and/or an IP class to be utilized by a shared context group. For example, the list of IP addresses, the IP address pool, and/or the IP class may be determined or obtained by the MME and/or SGSN during the first PDP connection establishment procedure that is performed by a member of the shared context group (e.g., when the shared context is initially established). For example, when the first group member attempts to attach itself to the network, the MME and/or SGSN may reserve a plurality of IP addresses for subsequent attach requests for other shared context group members. For user-plane traffic forwarding, one or more of the examples described herein may be used for bearer/context binding.

In an example, a PDN GW and/or GGSN may maintain a list of the IP addresses to be aggregated into a single GTP tunnel. The P-GW and/or the GGSN may maintain a DL TFT/GGSN mapping function that associates each of IP addresses for the shared context group with a single EPC bearer.

In an example, for an IP address family that is allocated to a shared context group, a bearer binding function may utilize a wildcard for associating a group of IP addresses with the group. The bearer binding function may be included in the PCEF. For example, if a Class C IP address beginning with 10.10.35.* is assigned to an MTC group, a TFT rule may be used to map the Class C traffic to the shared context. Thus, in this example the shared context may be associated with any IP address that begins with 10.10.35, such as 10.10.35.1, 10.10.35.2, . . . , 10.10.35.*, etc.

In an example, if a MTC-IWF is utilized (for example as shown in FIG. 13 MTC-IWF 1302), the MTC-IWF may provide an interface between the MTC server (e.g., AS 1308, AS 1310, and/or SCS 1304) and the core network. In an example, MTC-IWF 1302 may perform a mapping of a group identifier so that trigger requests can be made for a group of devices (e.g., MTC Device(s) 1306). For example, the MTC-IWF may indicate in the trigger message that the group of devices should share a PDP context.

When a device attempts to attach to the network or other establish PDN connectivity, the network and the device may perform mutual authentication and/or security procedures. Typically, devices may be individually authenticated, for example using an individual parameter such as an individual IMSI. In an example, even though a given device identifies itself as a member of a shared context group, the device may still be individually authenticated. For example, authentication and/or key generation (e.g., EPS Authentication and Key Agreement (EPS AKA) in E-UTRAN) may be individually performed by each shared context group member.

For example, if each device in a shared context group is associated with an individual IMSI, existing procedures for security and authentication may be utilized to establish security for and to authenticate devices that are group members. The network may execute the authentication procedure for each device after the initial connection procedure (e.g., UMTS) or initial attach request (e.g., LTE).

In an example, each of the members of a shared context group may be associated with a shared Group identifier. The Group identifier may replace the individual IMSI of a group member or may be used in addition to the individual IMSIs. In an example where all of the devices that are members of a given shared context group also share a Group identifier, then core network elements (e.g., the MME/SGSN) may determine that more than one WTRU/device may send an attach including the same IMSI (e.g., the Group identifier). In an example, the device/WTRU may send a secondary identifier in the attach request in order to allow the network to identify the connection status/configuration of the individual device shared context group members. In an example, the WTRU/device may refrain from providing the individual identifier to the network, and the shared context group members may be identified at the application layer. In this example, the network may be unaware of the identity of the shared context group member attempting to attach. Instead, the network may simply identify the device as one of the members of the shared context group. Although the process to establish the shared context and/or perform bearer binding using a Group identifier is similar to that of establishing the shared context and/or performing bearer binding using individual IMSIs, the security procedures used for devices using a Group identifier may be different.

For example, the authentication and/or key-set procedures may be modified for devices, such as MTC devices, that share a Group identifier. Devices within the shared context group may each include a unique root secret key (Ki). For example, if there a k devices in the shared context group, the kth device may include root secret key (Ki(k)). In an example, each of the root secret keys within a shared context group may be different than the root secret keys for other devices in the shared context group (e.g., the root secret keys are unique). In this case, for security setup the group members may each use a unique root secret key while sharing the same IMSI (e.g., a group IMSI ($IMSI_G$)).

In an example, if group members include unique root secret keys and a shared Group identifier, the device may utilize a shared attach-request transmission sequence for use in authentication and/or individual key setup. For example, the share context group members may attempt to attach to the network in a known order, thus allowing the network to determine which device is in the group is attempting to attach based on the number of devices that have previously attempted to attach. The shared attach-request transmission sequence may be predetermined and/or or may be determined by the device prior to sending the attach request. Knowledge of the attach sequence/order may be shared in pre-establishment message and/or predetermined by the group members and the HSS/HLR.

In an example, the HSS/HLR may be informed of the identities of the members of the shared context group (e.g., the identities of MTC devices belonging to the same group) that share a common IMSI (e.g., $IMSI_G$) but that utilize different root secret keys (e.g., Ki(k)|k=1, . . . , $N_G$ where $N_G$ may be the number of devices in the Group G). Each device in the shared context group may be pre-provisioned with the Group identifier (e.g., $IMSI_G$) and an individual root secret key (e.g., Ki(k)). The HSS/HLR and/or each of the MTC devices that is a member of the shared context group may also have knowledge the sequence by which MTC devices belonging to the same group are allowed to transmit the Attach request. The sequence used for determining the order in which the shared context group members attach may be a pseudo-random sequence. For example, the pseudo-random sequence may be computed based on an initial value, and the initial value may be pre-provisioned to the devices and the HSS/HLR. In an example, the pseudo-random sequence may be computed based on an initial value, and the initial value may be determined at the HSS/HLR and sent to the shared context group members over the air. Each device in the shared context group may maintain a timer for determining when the group member should transmit its attach request. The timer may allow the shred context group members to transmit an Attach request at a specific time instance in accordance with the Attach-request transmission sequence described above.

For example, the first MTC device in a shared context group may send an attach request to the MME and/or SGSN. The attach request may include the Group identifier (e.g., $IMSI_G$). The HSS/HLR may know which MTC device in the shared context group will send the first attach request. For example, a certain device in the shared context group may send the first attach request each time the devices in the group attempt to attach, and the group members and/or the HSS/HLR may know the identity of the first device. The HSS/HLR may maintain one or more timers to determine the time period windows during which other shared context group members may send attach requests following the initial attach request by the first device. In an example, the MME and/or SGSN may maintain the one more timers for identifying which group member is sending the next attach request in the attach-request sequence. The MME may then indicate the identity of the group member sending the attach request when forwarding the attach request to the HSS/HLR.

If the HSS/HLR determines that an attach request is from the MTC device that is allowed to send the first Attach request for the shared context group, the HSS/HLR may determine the root secret key for the first MTC device (e.g., Ki(1)). The HSS/HLR may generates the AKA Authentication Vector (AV) corresponding to Ki(1), and may send an Authentication Request to the first MTC device of the shared context group. The Authentication Request may include the RAND and/or the AUTN parts of the AV.

The first MTC device of the shared context group may receive the RAND and the AUTN parts of the AV. The first MTC device of the shared context group may authenticates the HSS/HLR and may compute an Authentication Response. The Authentication Response may include the RES computed by the first MTC device of the shared context group based on the received AV. The first MTC device of the shared context group may send the Authentication Response to the HLR/HSS in order to authenticate itself to the network.

The HSS/HLR may attempt to authenticate the first MTC device of the shared context group based on the RES included in the Authentication Response. If the HLR/HSS successfully authenticates first MTC device of the shared context group, then the HSS/HLR may obtains and/or determine the sequence S by which the other MTC devices in the same shared context group are expected to attempt authentication. The HSS/HLR may determine a set of AVs for use in authenticating the rest of the MTC devices belonging to the same shared context group. The HLR/HSS may determine the set of AVs at a single instance following the successful authentication of the first member of the shared context group or may individually compute AVs as it receives each attach request and/or Authentication response. For example, upon successful authentication of the first device in the shared context group, the HSS/HLR may provide the set of AVs for the remaining devices to the MME for a sequence of authentications. In an example, upon receiving the authentication request for the first device in the group, the HSS/HLR may provide the set of AVs for each of the group members to the MME for the subsequent authentication of the group. The AV corresponding to a k-th device in a shared context group (e.g., where k=1,2, . . . , $N_G$) may be computed by the HLR/HSS using the Ki(k) for the k-th MTC device in the group.

Upon successful authentication of the first device in the shared context group, the other shared context group members may each obtain and/or determine the same sequence S of Authentication request transmissions. Each device that is a member of the shared context group may determine the timing of its own Authentication response transmission based on its position within the sequence. In an example, the other group members may transmit the individual Authentication responses based on the determined timing using the AVs included in the original Authentication Request message, the Group identifier, and/or their individual root secret keys (e.g., Ki(2), Ki(3), . . . , Ki($N_G$)). In another example, each group member may be sent individual AVs for calculating Authentication Responses based on the individual AVs, the Group identifier, and/or their individual root secret keys (e.g., Ki(2), Ki(3), . . . , Ki($N_G$)).

In an example, each of the shared context group members may perform authentication in accordance with the determined sequence S. In an example, the HSS/HLR may generate individual authentication vectors for each of the individual shared context group members. For example, upon receiving an authentication request from an MME that corresponds to the j-th MTC device in the a shared context group, the HSS/HLR may send to the MME the AV(j) corresponding to the Ki(j) shared with the j-th MTC device. The MME may forward RAND and AUTN of AV(j) along with other parameters to the j-th MTC Device. The j-th MTC device may sends an authentication response including the determined RES(j) corresponding to AV(j) and Ki(j) to the MME. The MME may authenticate the j-th MTC device based on the RES(j) and may derive a session key Ks(j). The MME may send authentication success message to the j-th MTC Device. Upon receiving the authentication success message, the j-th MTC Device may determine the same session key Ks(j). The process may then be repeated for the (j+1)-th MTC device according to the sequence S.

In an example, an attach request may include additional information that may be used to differentiate between MTC devices within a shared context group. For example, authentication and individual key set up for individual MTC Device that share the Group identifier (e.g., a Group IMSI) may be individually performed if each of the MTC devices in the shared context group sends, in addition to the same shared Group identifier (e.g., $IMSI_G$), additional information to individually identify the individual device. For example, a device that is a member of a shared context group may send an additional information element in an attach request that may uniquely identify which member of the shared context group is sending the attach request.

For example, the HSS/HLR may be informed of the identities of the members of the shared context group (e.g., the identities of MTC devices belonging to the same group) that share a common IMSI (e.g., $IMSI_G$) but that utilize different root secret keys (e.g., Ki(k)|k=1, . . . , $N_G$ where $N_G$ may be the number of devices in the Group G). Each device in the shared context group may be pre-provisioned with the Group identifier (e.g., $IMSI_G$) and an individual root secret key (e.g., Ki(k)). Each of the MTC Devices in a shared context group may be provided with and/or may determine additional information that may be used to individually identity a single device within the shared context group. The information that may be used to individually identity a device within shared context group may be referred to as MTC Device individual identifying information (e.g., $III_{MTCD}$). An example of $III_{MTCD}$ may be an international mobile equipment identity (IMEI) and/or an IMSI. The $III_{MTCD}$ for a k-th device with the shared context group may be denoted as $III_{MTCD(k)}$.

The HSS/HLR may know and/or determine the $III_{MTCD}$ for each of the MTC devices belonging to the shared context group. The HSS/HLR may be pre-provisioned with and/or may individually determine the authentication vectors {AV (k); k=1,2, . . . $N_G$,} for each of the MTC devices in the shared context group. AV(k) may be determined by the HLR/HSS based on $IMSI_G$ and the individual shared key Ki(k), which may be specific to for the k-th device that is a member of the shared context group.

An MTC device that belongs to a shared context group may initiate the authentication process by sending an Attach Request message to the network. In order to identify the individual device sending the Attach request, the EPS attach type information element may identify the sending device as belonging to a shared context group. The inclusion of the indication that the sending device is a member of a shared context group may trigger the network to process the attach request message in a manner that is different than for attach requests for devices that are not members of shared context groups. Table 1 illustrates how using a value of '011' for an EPS attach type value in octet 1 of the EPE attach type IE may indicate that the attach request is part of an EPS group attach procedure.

TABLE 1

EPS Attach Type IE indicating a Group Attach

| EPS attach type IEI | | 0 | EPS attach type value | octet 1 |
| --- | --- | --- | --- | --- |
| | | Spare | | |

EPS attach type value (octet 1)
Bits

| 3 | 2 | 1 | |
| --- | --- | --- | --- |
| 0 | 0 | 1 | EPS attach |
| 0 | 1 | 0 | combined EPS/IMSI attach |
| 0 | 1 | 1 | EPS group attach (new value) |
| 1 | 1 | 0 | EPS emergency attach |
| 1 | 1 | 1 | reserved |

All other values are unused and shall be interpreted as "EPS attach", if received by the network.
Bit 4 of octet 1 is spare and shall be coded as zero.

An MTC device in the shared context group, for example the k-th device, may send an Attach Request to the MME. The Attach Request may include the Group identifier (e.g., $IMSI_G$) and the individual MTC device identifying information (e.g., $III_{MTCD(k)}$). The individual MTC device identifying information (e.g., $III_{MTCD(k)}$) may be added, in addition to the $IMSI_G$, in the Attach request.

In an example the Group identifier (e.g., $IMSI_G$) may be combined with the individual MTC device identifying information (e.g., $III_{MTCD(k)}$) to derive an shared context group member specific quantity that may be referred to as the MTC Device Combined Identity Information for the k-th device ($DCI_{MTCD(k)}$). The MTC Device Combined Identity Information for the k-th device ($DCI_{MTCD(k)}$ may be designed to be 15 digits in length and to be in accordance with the IMSI format of the existing Attach request message. For example, a device and/or network node may determine the MTC Device Combined Identity Information for the k-th device ($DCI_{MTCD(k)}$ based on Equation (1).

$$DCI_{MTCD(k)} = MCC \| MNC \| ID_G \| \text{ConvertDigit} \{ \text{Trunc} \{ HA \{ IMSI_G \| III_{MTCD(k)} \}, 12 - \text{LenDigits} \{ MNC \| ID_G \} \} \} \quad \text{Equation (1)}$$

where MCC may be the 3-digit mobile country code, MNC may be the 2-digit (e.g., in EU) or 3-digit (e.g., in the US) mobile network code of the original Group identifier (e.g., $IMSI_G$), $ID_G$ may be the digit representation of the Group ID, HA {x} may be a cryptographic hash function (e.g., SHA-1 and/or other cryptographic hash functions), Trunc {x,y} may be a function that truncates an arbitrary bit sequence x into y digits, and ConvertDigit{x} may be a function that converts a binary sequence x into Digits, and LenDigits {x} may be a function that outputs the digit length of input x.

Upon receiving the attach request, the MME may forward the attach request including the value for $DCI_{MTCD(k)}$ to the HSS/HLR. The HSS/HLR may identify the MTC Device Group and/or the shared context group, for example based on the MNC and IDG. The HSS/HLR may have knowledge of the possible values of $\{DCI_{MTCD(j)} \| j=1,2, \ldots, N_G\}$ for the MTC Devices that are members of the shared context group. For example, the HSS/HLR may have determined the identity of the group when it determined a value for the $ID_G$, and the HSS/HLR may have previously determined and/or stored each of the individual MTC device identifying information (e.g., $III_{MTCD(k)}$) values. Therefore, when the HLR/HSS receives an authentication request including a $DCI_{MTCD(i)}$, the HLR/HSS may determine which AV(k) to provide for authentication purposes. The HLR/HSS may send the AV that corresponds to the AV for the device identified by the $DCI_{MTCD(i)}$. The AV that corresponds to the AV for the device identified by the $DCI_{MTCD(i)}$ (e.g., AV(k)) may be determined based on the Group identifier (e.g., $IMSI_G$) and Ki(k). The HLR/HSS may determine Ki(k) based on the identifying information for device number k included in the received $DCI_{MTCD(k)}$.

The HSS/HLR may send an AV(k) to the MME. The MME may then send an Authentication Request that includes the RAND and AUTN part of AV(k) to the k-th MTC Device that is a member of the shared context group (e.g., the device that sent the attach request). The k-th MTC device that is a member of the shared context group, may receive the RAND and AUTN part of the AV(k) and may authenticate the HSS/HLR using the received information. The k-th MTC device that is a member of the shared context group may determine the Authentication Response and send the Authentication Response to the MME. The Authentication Response may include RES(k) that was computed by the k-th MTC device that is a member of the shared context group based on the received RAND and AUTN part of the AV(k) and the shared key Ki(k). The MME may forward the Authentication response to the HLR/HSS in order to allow the HLR/HSS to authenticate the MTC device subscription. The HSS/HLR may attempt to authenticate the MTC Device based on the received RES(k). A similar authentication procedure may be repeated for the other MTC devices that belong to the shared context group. If individual identification information for an individual member of the shared context group is included in the attach request (e.g., $III_{MTCD(k)}$, then the members of the shared context group may attach to the network in any order at any time.

In an example, a Gateway Device may be utilized to authenticating itself as a representative for a shared context group, and other, non-gateway devices that are members of the shared context group may be authenticated based on Device-to-Device connectivity.

For example, authentication and individual key set up for individual MTC device(s) that share the Group identifier (e.g., $IMSI_G$) may be performed using a gateway capable of mutual authentication. For example, there may be an MTC gateway device configured to perform non-3GPP a mutual authentication and/or key derivation process with each of the other MTC devices that are part of a shared context group. For example, with respect to FIG. 9, MTC Gateway Device 904 may be a 3GPP device (e.g., a WTRU) capable of operable communication with Local-Access Device 906, MTC Device 908, Local-Access Device 910, and/or MTC Device 912. MTC Gateway Device 904 may be a member of a shared context group. Local-Access Device 906, MTC Device 908, Local-Access Device 910, and/or MTC Device 912 may also be members of the same shared context group. Local-Access Device 906, MTC Device 908, Local-Access Device 910, and/or MTC Device 912 may be referred to as MTC non-gateway devices. MTC-Gateway Device 904 may use a device-to-device connectivity in order authenticate the MTC non-gateway devices to the 3GPP network. For example, MTC Gateway Device 904 may be configured to mutually obtain a session key for each of the non-gateway devices. Each of the non-gateway devices may obtain its corresponding session key, for example by receiving it from the gateway device (e.g., via a cryptographically protected message). In another example, MTC Gateway Device 904 and the MTC non-gateway devices may exchange the session keys based on a shared secret between the gateway and non-gateway devices.

In an example, the MTC gateway device may perform mutual authentication with the 3GPP network and may authenticate the 'group' of MTC devices to the network. For example, the gateway may authenticate the non-gateway devices with itself and may then authenticate the non-gateway devices with the 3GPP network, for example based on information received in the authentication procedure performed between the gateway and non-gateway devices. The MTC gateway device may authenticate itself with the 3GPP network at the same time as it authenticates the non-gateway devices and/or shared context group devices. Upon authenticating the group, the MTC gateway devices may distribute 3GPP session keys for to the non-gateway devices for use in future communications.

In an example, the MTC gateway device and/or the MTC non-gateway devices may establish a MTC non-gateway device to MTC gateway device key. For example, the MTC gateway device may perform a non-3GPP mutual authentication between itself and one or more non-gateway devices. The non-3GPP mutual authentication procedure may establish local keys for supporting cryptographic communication between the gateway device and the non-gateway devices. For example, the non-3GPP mutual authentication procedure/local keys may be used to communicate a 3GPP network-aware key that may be distributed to the various individual non-gateway devices after they have been authenticated with the 3GPP network. The MTC gateway device may perform a 3GPP mutual authentication between itself and the Network (e.g., with the MME and HSS/HLR), for example using existing 3GPP/LTE AKA mechanisms. The result of the 3GPP mutual authentication procedure may be that the gateway device is able to determine a gateway key from the 3GPP network. The gateway device may then determine a device-specific key for itself based on the gateway key received from the network.

The MTC gateway device may determine device-specific keys for other MTC devices in the shared context group based on the obtained gateway key. The MTC gateway device may distribute the determined device-specific keys to the non-gateway devices, for example using local keys that were determined during the local, non-3GPP authentication procedure. The MTC gateway device may send the individual device-specific keys for the non-gateway devices to the MME. Thus, the MTC Gateway device may authenticate the non-gateway devices on behalf of the network (e.g., MME and/or HLR/HSS). Thus, the MME may effectively authenticated the MTC devices in a shared context group without having done so individually for each non-gateway device. Additionally, the MME may have access to the individual keys for both the gateway device and the non-gateway devices.

In an example, the gateway device may perform authentication of one or more non-gateway devices in by including individual device identifying information (e.g., $III_{MTCD}$). The gateway device may establish a MTC non-gateway device to MTC gateway device key in a manner similar to the case where the attach request does not include individual identifying information. For example, the MTC gateway device may perform a non-3GPP mutual authentication between itself and one or more non-gateway devices. The non-3GPP mutual authentication procedure may establish local keys for supporting cryptographic communication between the gateway device and the non-gateway devices. The Gateway device may send an Attach Request to the 3GPP network. The attach request may identify the group identifier and/or one or more individual device identifiers. In an example, the gateway device may include an individual device identifier for the gateway device in the attach request, but may not include individual identifiers for non-gateway devices. In an example, the gateway device may include an individual device identifier for the gateway device in the attach request, as well as one or more individual identifiers for non-gateway devices.

The MTC gateway device may perform a 3GPP mutual authentication between itself and the Network (e.g., with the MME and HSS/HLR), for example using existing 3GPP/LTE AKA mechanisms. The result of the 3GPP mutual authentication procedure may be that the gateway device is able to determine a gateway key from the 3GPP network. The gateway device may then determine a device-specific key for itself based on the gateway key received from the network.

The MTC gateway device may determine device-specific keys for other MTC devices in the shared context group based on the obtained gateway key. The MTC gateway device may distribute the determined device-specific keys to the non-gateway devices, for example using local keys that were determined during the local, non-3GPP authentication procedure. The MTC gateway device may send the individual device-specific keys for the non-gateway devices to the MME. Thus, the MTC Gateway device may authenticate the non-gateway devices on behalf of the network (e.g., MME and/or HLR/HSS). Thus, the MME may effectively authenticated the MTC devices in a shared context group without having done so individually for each non-gateway device. Additionally, the MME may have access to the individual keys for both the gateway device and the non-gateway devices.

In an example, the gateway device may perform authentication with the 3GPP network in such a way that one, a plurality, and/or all of the devices of a shared context group (including gateway device) may be authenticated to the network during the authentication of the gateway device by the network. For example, the authentication response (RES) the gateway device sends to the 3GPP network during authentication may be determined based on one or more the individual root secret keys Ki(k). For example, the authentication response (RES) the gateway device sends to the 3GPP network during authentication may be determined based on all of the individual root secret keys Ki(k) for all of the members of the shared context group (e.g., all of the non-gateway devices as well as the gateway device itself). For example, the gateway device (and/or the HSS/HLR) to may determine and use an appropriate RES value (e.g., XRES value in the case of HSS/HLR) that is determined based on a cryptographic combination of the individual root secret keys.

In an example, an appropriate RES value and/or XRES value may be determined for a shared context group of size N, and may be used to authenticate the individual group members. For example, non-gateway device (e.g., the k-th device), may receive an authentication request including a nonce(k) from the gateway device. The non-gateway device may authenticate itself to the gateway device by sending a response (e.g., RES(k), where k=1,2, . . . , $N_G$–1). The response may be determined based on Equation (2):

$$\text{RES}(k) = \text{hash}(Ki(k) \| \text{nonce}(k)) \qquad \text{Equation (2)}$$

For purposes of illustration, $k=N_G$ may be used as a representative index for the gateway device, and non-gateway devices may be indexed from k=1 to k=$N_G$–1. The nonce(k), for example for 3GPP AKA, may include RAND and AUTN values for the k-th device.

Upon receiving responses from the non-gateway devices (e.g., {RES(k)} k=1, . . . , $N_G$–1), the gateway device may compute its own response (e.g., RES($N_G$)) to be sent to the MME. The response value determined by the gateway (e.g., RES($N_G$)) may be based on each of the individual responses (e.g., RES(1), RES (2), . . . , RES($N_G$–1)) as well as the nonce($N_G$) value previously sent to the gateway device from the MME and/or the root secret key for the gateway device (e.g., Ki($N_G$)). For example, the following loop may be used to determine the RES($N_G$) to be sent from the gateway device based on the root secret key for the gateway device (e.g., Ki($N_G$)), the nonce($N_G$) value previously sent to the gateway device from the MME, and the individual responses received by the gateway device from the non-gateway devices:

```
Temp = hash( Ki(N_G) || nonce(N_G) );
For k=1 to N_G-1
  Temp = hash( Temp || RES(k) ) ;
End ;
  RES(N_G) = Temp;
```

Thus, the response ultimately returned to the network (e.g., RES($N_G$)), is determined by the gateway device based on the individual responses of the non-gateway devices and the individual response of the gateway device. As may be appreciated, if one of the non-gateway devices fails to be authenticated by the gateway device, then the gateway device may be unable to compute a valid RES for its own authentication to be returned to the network, which may be the authentication for the entire shared context group. Thus, the group would be unable to be authenticated to the HSS/HLR. In an example, individual keys for shared context group devices (e.g., including the gateway and the non-gateway devices) may be determined by one or more of the shared context group devices and/or the MME.

For example, Key Ks($N_G$) may be the session key for the gateway device. In an example, Key Ks($N_G$) may be determined by one or more of the shared context group devices and/or the MME using Equation (3):

$$Ks(N_G) = CK(N_G) || IK(N_G) \quad \text{Equation (3)}$$

Ks($N_G$) may be determined by the MME and/or the gateway device in a manner that is similar to the UMTS/LTE AKA session key Ks derivation. For example, Ki($N_G$) and the RAND($N_G$) may be used as part of the authentication vector AV($N_G$) and Ki($N_G$) may be used as the cryptographic information source in the UMTS AKA Key Derivation Functions (e.g., KDFs, such as the f3k and f4k function described in 3GPP TS 33.102).

In an example, Keys {Ks(k); k=1, . . . , $N_{G-1}$} (e.g., the session keys for the non-gateway devices) may be determined at the MME based on knowledge of the individual root secret keys (e.g., Ki(k); k=1, . . . , $N_{G-1}$) and the RAND part of Authentication Vector AV(k) for the non-gateway device(s). In an example, a separate 'Group session key,' which may be referred to as Ks(G), may be determined for use in protection of group and/or multicast messages. For example, Ks(G) may be derived in manner similar to the UMTS/LTE AKA session key Ks derivation, using appropriately manipulated/processed Ki(G) and RAND(G).

A PDP context may be shared across a plurality of capillary network devices that communicate through a 3GPP gateway. A capillary network device may be a non-3GPP device. A non-3GPP device may refer to a device that is configured to communicate using a communication protocol that is different than a 3GPP communication protocol. For example, IEEE 802.11 is an example of a non-3GPP protocol and a device configured to communicate using an IEEE 802.11 protocol may be an example of a non-3GPP device. In an example, a non-3GPP device may be a device that is incapable of communicating using a 3GPP protocol. For example, the non-3GPP device may not be a subscriber to the 3GPP network.

Figure 14:
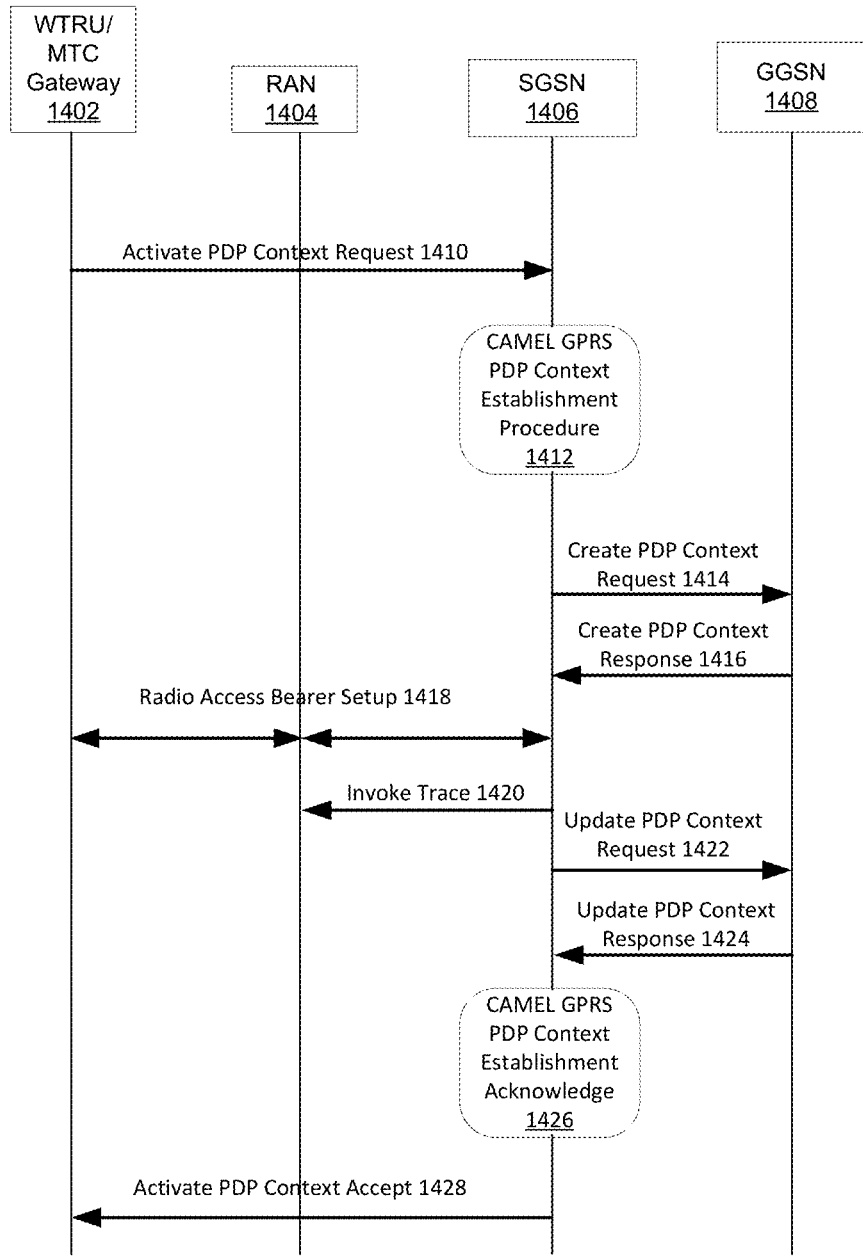
FIG. 14 illustrates an example PDP context activation procedure.

In an example, sharing a PDP connect across multiple non-3GPP devices may be performed by modifying a PDP context activation procedure. FIG. 14 illustrates an example PDP context activation procedure that may be performed by a WTRU/MTC gateway device. For example, as shown in FIG. 14, WTRU/MTC Gateway 1402, which may by a 3GPP WTRU acting as a gateway for one or more capillary network devices that are part of a shared context group, may send Activate PDP Context Request 1410 to SGSN 1406. Activate PDP Context Request 1410 may include a request that the core network allocate multiple IP addresses for a new PDP context that is being established. For example, the Protocol configuration options IE included in Activate PDP Context Request 1410 may include an indication of the number of IP addresses being requested by WTRU/MTC Gateway 1402. For example, WTRU/MTC Gateway 1402 may utilize the spare bits in the protocol configuration options IE to indicate the desired number of IP addresses. Example protocol configuration options for WTRU/MTC Gateway 1402 are shown in Table 2.

TABLE 2

| Protocol configuration options information element | |
|---|---|
| Protocol configuration options IEI | octet 1 |
| Length of protocol config. options contents | octet 2 |
| 0 0 0             Configuration | octet 3 |
| 0       protocol | |
| ext    Spare | |
| Protocol ID 1 | octet 4 |
|  | octet 5 |
| Length of protocol ID 1 contents | octet 6 |
|  | octet 7 |
| Protocol ID 1 contents | |
|  | octet m |
| Protocol ID 2 | octet m + 1 |
|  | octet m + 2 |
| Length of protocol ID 2 contents | octet m + 3 |
|  | octet m + 4 |
| Protocol ID 2 contents | |
|  | octet n |
|  | octet n + 1 |
| ... | |
|  | octet u |
| Protocol ID n-1 | octet u + 1 |
|  | octet u + 2 |
| Length of protocol ID n-1 contents | octet u + 3 |
|  | octet u + 4 |
| Protocol ID n-1 contents | |
|  | octet v |
| Protocol ID n | octet v + 1 |
|  | octet v + 2 |
| Length of protocol ID n contents | octet v + 3 |
|  | octet v + 4 |
| Protocol ID n contents | |
|  | octet w |
| Container ID 1 | octet w + 1 |
|  | octet w + 2 |
| Length of container ID 1 contents | octet w + 3 |
| Container ID 1 contents | octet w + 4 |
|  | octet x |
|  | octet x + 1 |
| ... | |
|  | octet y |
| Container ID n | octet y + 1 |
|  | octet y + 2 |
| Length of container ID n contents | octet y + 3 |
| Container ID n contents | octet y + 4 |
|  | octet z |

The core network may determine the number of requested IP addresses based on the four spare bits in octet 3 of the protocol configuration option IE, for example as shown in Table 2. For example, the number of requested IP addresses can be encoded using one or more of the following techniques.

For example, the number of requested IP addresses can be encoded in such a way that the spare bits may represent one less than the number of requested IP addresses. For example, a spare bit value of '0000' may indicate that the WTRU is requesting a single IP address. A spare bit value of '1111' may indicate that the WTRU is requesting 16 IP addresses. With this approach, the WTRU/gateway may be able to request between 1 and 16 (inclusive) IP addresses with a single activate PDP context request message.

In an example, the number of requested IP addresses can be encoded in such a way that the spare bits may represent an exponential function for determining the number of IP addresses that have been requested. For example, the number of IP addresses requested by the WTRU/gateway may be equal to 2^(Spare Bits Value). For example, a spare bits value of '0000' (e.g., Spare Bits Value=0) may represent a request for a single IP address. A spare bits value of '0001' (e.g., Spare Bits Value=1) may represent a request for two IP addresses. A spare bits value of '0010' (e.g., Spare Bits Value=2) may represent a request for four IP addresses. Using an exponential function may allow a WTRU/gateway to 1, 2, 4, 8, . . . 32,768 addresses with a single activate PDP context request message.

In an example, a new field may be added to an IE within the Activate PDP Context Request 1410 to explicitly indicate the number of requested IP addresses. IN an example, the spare bits of the protocol configuration options IE may be used to indicate whether or not this new field is present in Activate PDP Context Request 1410. At 1412, SGSN 1406 may perform a CAMEL GPRS Context Establishment Procedure.

SGSN 1406 may send Create PDP Context Request 1414 to GGSN 1408. SGSN 1406 may indicate the number of requested IP addresses to GGSN 1408 using the spare bits included in the protocol configuration options IE that is included in Create PDP Context Request 1414. For example, SGSN 1406 may use similar techniques to include the request for multiple IP addresses in Create PDP Context Request 1414 as WTRU/MTC Gateway used to include the request for multiple IP addresses in Activate PDP Context Request 1410. For example, the number of requested IP addresses may be indicated using the spare bits and/or a new field may be created to indicate the number of requested IP addresses.

GGSN 1408 may indicate the number of IP addresses assigned/allocated to WTRU/MTC Gateway 1402 in Create PDP Context Response 1416. For example, GGSN 1408 may indicate the number of allocated IP addresses to SGSN 1406 using the spare bits included in the protocol configuration options IE that is included in Create PDP Context Response 1416. For example, GGSN 1408 may use similar techniques to include indication of the number of assigned IP addresses in Create PDP Context Response 1414 as WTRU/MTC Gateway used to include the request for multiple IP addresses in Activate PDP Context Request 1410. For example, the number of allocated IP addresses may be indicated using the spare bits and/or a new field may be created to indicate the number of allocated IP addresses.

At 1418, Radio Access Bearer Setup may be performed between WTRU/MTC Gateway 1402, RAN 1404, and or SGSN 1406. If BSS trace is activated, SGSN 1406 may send Invoke Trace 1420 to RAN 1404. In an example, Update PDP Context Request 1422, which may be used to update an existing PDP context, may also be used to indicate an updated request for IP addresses. Update PDP Context Response 1424 may indicate an updated number of allocated IP address (e.g., based on the updated PDP context request). If so, at 1426, SGSN 1406 may perform a CAMEL GPRS Context Acknowledgement Procedure.

Upon receiving an indication regarding the number of allocated IP addresses (e.g., in Create PDP Context Response 1416 and/or Update PDP Context Response 1424), SGSN 1406 may send Activate PDP Context Accept 1428 to WTRU/MTC Gateway 1402. For example, SGSN 1406 may indicate the number of IP addresses assigned/allocated to WTRU/MTC Gateway 1402 in Activate PDP Context Accept 1428. For example, SGSN 1406 may indicate the number of allocated IP addresses to WTRU/MTC Gateway 1402 using the spare bits included in the protocol configuration options IE that is included in Activate PDP Context Accept 1428. For example, SGSN 1406 may use similar techniques to include indication of the number of assigned IP addresses in Activate PDP Context Accept 1428 as WTRU/MTC Gateway used to include the request for multiple IP addresses in Activate PDP Context Request 1410. For example, the number of allocated IP addresses may be indicated using the spare bits and/or a new field may be created to indicate the number of allocated IP addresses.

In an example, when more than one IP address is assigned to WTRU/MTC Gateway 1402, WTRU/MTC Gateway 1402 may assume that contiguous IP addresses were assigned by GGSN 1408. For example, WTRU/MTC Gateway 1402 may determine a starting IP address from the address information field in the PDP Address included in Activate PDP Context Accept 1428. Based on indication regarding the number of assigned IP addresses and the starting IP address, WTRU/MTC Gateway 1402 may determine each of the IP addresses that were allocated to WTRU/MTC Gateway 1402. The core network may consider the allocated IP addresses to be in use beginning from the time the PDP context is activated.

In an example, GGSN 1408 may assign IP addresses to WTRU/MTC Gateway 1403 in a non-contiguous manner. For example, the assigned IP addresses may be individually assigned and individually indicated to WTRU/MTC Gateway 1402. One or more new fields can be added to Create PDP Context Response 1416, Update PDP Context Response 1424, and/or Activate PDP Context Accept 1428 to explicitly indicate that values for IP addresses that have been assigned to WTRU/MTC Gateway 1402.

The allocation of multiple IP addresses for use in conjunction with a single PDP context may imply changes in functionality for an SGSN and/or a GGSN managing a GTP tunnel used to transport user data. For example, multiple IP addresses may be mapped to the same GTP tunnel.

Figure 15:
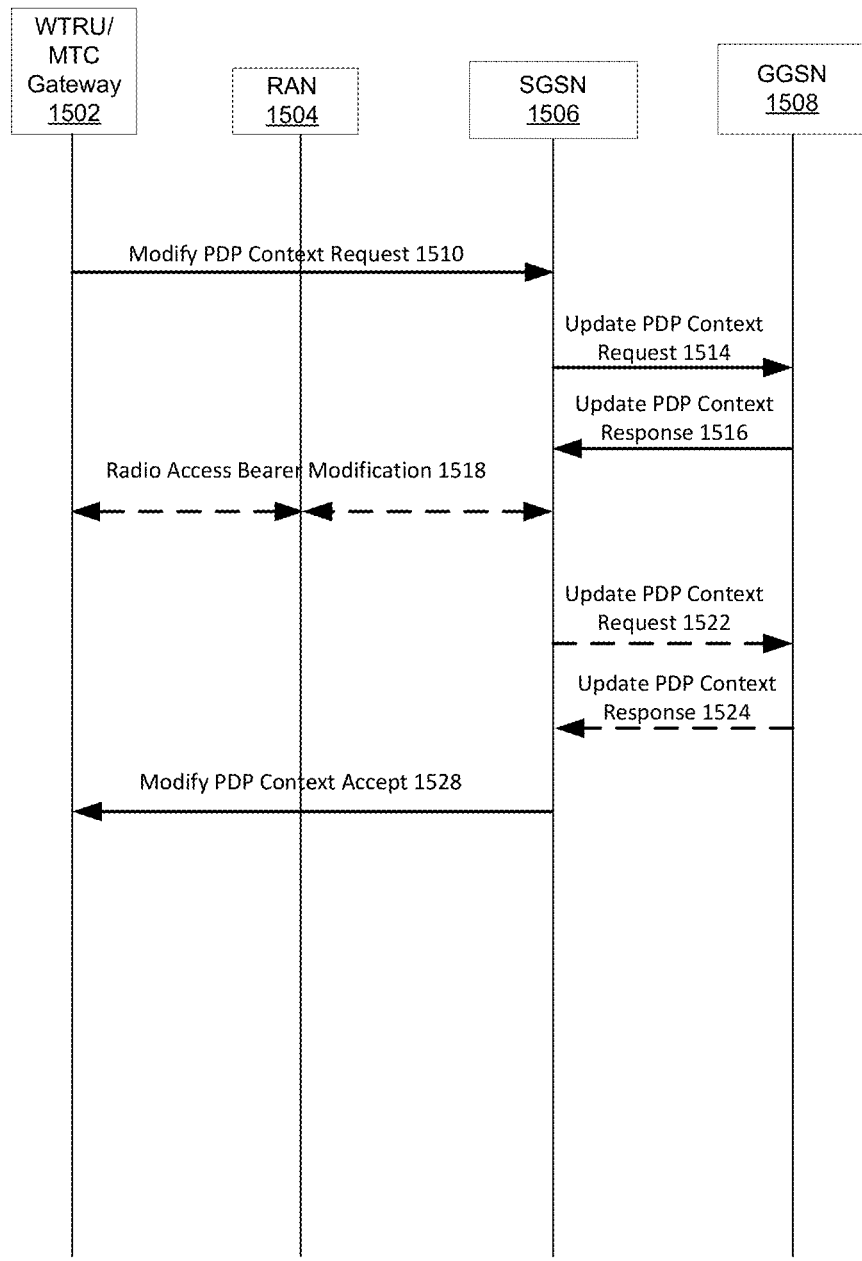
FIG. 15 illustrates and example PDP context modification procedure.

If the WTRU/MTC Gateway determines to request more and/or less IP addresses for a given PDP context after the PDP context has been activated, WTRU may utilize modify PDP context procedure. For example, FIG. 15 illustrates an example modify PDP context procure which may be used by a WTRU/MTC Gateway Device request additional or fewer IP addresses a exiting, active PDP context. For example, as shown in FIG. 15, WTRU/MTC Gateway 1502, which may by a 3GPP WTRU acting as a gateway for one or more non-3GPP devices that are part of a shared context group, may send Modify PDP Context Request 1510 to SGSN 1506. Activate PDP Context Request 1510 may include a request that the core network modify the allocation of IP addresses for an existing active PDP context. For example, the Protocol configuration options IE included in Modify PDP Context Request 1510 may include an indication of the number of IP addresses that WTRU/MTC Gateway 1502 would like the network to assign for the active PDP context. The number of IP addresses that WTRU/MTC Gateway 1502 would like the network to assign for the active PDP context may be differently than the number of currently assigned addresses. For example, WTRU/MTC Gateway 1502 may utilize the spare bits in the protocol configuration options IE to indicate the desired number of IP addresses. Example protocol configuration options for WTRU/MTC Gateway 1502 are shown in Table 2. For example, WTRU/MTC gateway 1502 of FIG. 15 may use similar techniques to include the request for multiple IP addresses in Modify PDP Context request 1510 as WTRU/MTC Gateway 1402 of FIG. 14 used to include the request for multiple IP addresses in Activate PDP Context Request 1410. For example, the number of requested IP addresses may be indicated using the spare bits and/or a new field may be created to indicate the number of requested IP addresses.

SGSN 1506 may send Update PDP Context Request 1514 to GGSN 1508. SGSN 1506 may indicate the number of requested IP addresses to GGSN 1508 using the spare bits included in the protocol configuration options IE that is included in Update PDP Context Request 1514. For example, SGSN 1506 may use similar techniques to include the request for multiple IP addresses in Update PDP Context Request 1514 as WTRU/MTC Gateway 1502 used to include the request for multiple IP addresses in Modify PDP Context Request 1510. For example, the number of requested IP addresses may be indicated using the spare bits and/or a new field may be created to indicate the number of requested IP addresses.

GGSN 1508 may indicate the new number of IP addresses assigned/allocated to WTRU/MTC Gateway 1502 in Update PDP Context Response 1516. For example, GGSN 1508 may indicate the number of allocated IP addresses to SGSN 1506 using the spare bits included in the protocol configuration options IE that is included in Update PDP Context Response 1516. For example, GGSN 1508 may use similar techniques to include indication of the number of assigned IP addresses in Update PDP Context Response 1514 as WTRU/MTC Gateway 1502 used to include the request for multiple IP addresses in Update PDP Context Request 1510. For example, the number of allocated IP addresses may be indicated using the spare bits and/or a new field may be created to indicate the number of allocated IP addresses.

At 1518, Radio Access Bearer Setup may be performed between WTRU/MTC Gateway 1502, RAN 1504, and or SGSN 1506. In an example, Update PDP Context Request 1522, which may be used to update an existing PDP context, may also be used to indicate an updated request for IP addresses. Update PDP Context Response 1524 may indicate an updated number of allocated IP address (e.g., based on the updated PDP context request).

Upon receiving an indication regarding the number of allocated IP addresses (e.g., in Update PDP Context Response 1516 and/or Update PDP Context Response 1524), SGSN 1506 may send Modify PDP Context Accept 1528 to WTRU/MTC Gateway 1502. For example, SGSN 1506 may indicate the number of IP addresses assigned/allocated to WTRU/MTC Gateway 1502 in Update PDP Context Accept 1528. For example, SGSN 1506 may indicate the number of allocated IP addresses to WTRU/MTC Gateway 1502 using the spare bits included in the protocol configuration options IE that is included in Update PDP Context Accept 1528. For example, SGSN 1506 may use similar techniques to include indication of the number of assigned IP addresses in Update PDP Context Accept 1528 as WTRU/MTC Gateway 1502 used to include the request for multiple IP addresses in Update PDP Context Request 1510. For example, the number of allocated IP addresses may be indicated using the spare bits and/or a new field may be created to indicate the number of allocated IP addresses.

In an example, when more than one IP address is assigned to WTRU/MTC Gateway 1502, WTRU/MTC Gateway 1502 may assume that contiguous IP addresses were assigned by GGSN 1508. For example, WTRU/MTC Gateway 1502 may determine a starting IP address from the address information field in the PDP Address included in an original Activate PDP Context Accept message. Additionally, if additional IP addresses were assigned to the WTRU/MTC gateway, the WTRU/MTC Gateway may determine that the additional IP addresses begin after the final IP address associated with the previous allocation. In an example, Based on the indication regarding the number of assigned IP addresses and the starting IP address, WTRU/MTC Gateway 1502 may determine each of the IP addresses that were allocated to WTRU/MTC Gateway 1502.

In an example, GGSN 1508 may assign IP addresses to WTRU/MTC Gateway 1502 in a non-contiguous manner. For example, one or more of the assigned IP addresses may be individually assigned and/or individually indicated to WTRU/MTC Gateway 1502. One or more new fields may be added to Update PDP Context Response 1516, Update PDP Context Response 1524, and/or Modify PDP Context Accept 1528 to explicitly indicate that values for IP addresses that have been assigned to WTRU/MTC Gateway 1502.

In an example, WTRU/MTC Gateway 1502 may use Modify PDP Context Request 1510 to request that a particular IP address (or IP addresses) be allocated to WTRU/MTC Gateway 1502. For example, the IP Address(es) that WTRU/MTC Gateway 1502 determines to request may be explicitly indicated in new fields of Modify PDP Context Request 1510. The spare bits of the protocol configuration options IE may be used to indicate whether or not the new field(s) that include the request for one or more specific IP addresses are present. Similarly, one or more of Update PDP Context Request 1514, Update PDP Context Response 1518, Update PDP Context Request 1522, Update PDP Context Response 1524, and/or Modify PDP Context Accept 1528 may be updated to explicitly indicate the requested IP address(es) and/or the values of the allocated IP addresses.

In an example, the WTRU/MTC Gateway 1502 may use the Modify PDP Context Request 1510 to indicate to the network that one or more particular IP address(es) are no longer requested by WTRU/MTC Gateway 1502. For example, the IP Addresses that WTRU/MTC Gateway 1502 wants to release may be be explicitly indicated in one or more new fields in the Modify PDP Context Request 1510. The spare bits of the protocol configuration options IE may be used to indicate if the one or more new fields that explicitly indicate IP addresses to be released are present. The Update PDP Context Request 1514, Update PDP Context Response 1518, Update PDP Context Request 1522, Update PDP Context Response 1524, and/or Modify PDP Context Accept 1528 may be updated to explicitly indicate values of the IP addresses that are to be released from WTRU/MTC Gateway 1502.

Utilizing the techniques described with respect allocating multiple IP addresses for a single PDP context may reduce the amount of signaling overhead generated between a MTC Gateway and the core network. The reduced overhead may be especially apparent when a large number of devices are connecting substantially simultaneously from behind an MTC gateway. In an example, sharing a PDP context while still allowing non-3GPP devices to be allocated an individual IP address may provide a convenient method for the core network to monitor and/or charge for non-3GPP devices that connect to an MTC server over a 3GPP network using an MTC Gateway. The sharing of a PDP context among non-3GPP devices that are allocated individual IP addresses may allow unique IP addresses to be assigned to capillary network devices, thus simplifying the mapping between external identifiers and transport addresses.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for sharing a packet data protocol (PDP) context among a plurality of devices, the method comprising:
    a first wireless transmit/receive unit (WTRU) sending a first request to establish the PDP context, wherein the PDP context is associated with the first WTRU;
    the first WTRU establishing the PDP context;
    the first WTRU sending a second request to modify the established PDP context, wherein the second request to modify the established PDP context comprises an indication to allow a second WTRU to share the established PDP context thereby modifying the previously established PDP context into an established shared PDP context;
    the first WTRU receiving a response indicating that the second request to modify the established PDP context was accepted, wherein the response comprises information associated with the second WTRU; and
    the first WTRU acting as a gateway for the second WTRU in a shared context group, wherein the second WTRU shares the established shared PDP context with the first WTRU.

2. The method of claim 1, wherein the first request to establish the PDP context or the second request to modify the established PDP context is an attach request and an indication that the first WTRU is a member of the shared context group is a group international mobile subscriber identity (IMSI) or a Group identification (ID).

3. The method of claim 1, further comprising the first WTRU authenticating with one or more core network nodes, wherein the first WTRU authenticates the second WTRU that is a member of the shared context group when the first WTRU authenticates with the one or more core network nodes.

4. The method of claim 3, wherein the first WTRU determines an authentication response based on authentication responses of a plurality of other devices that are members of the shared context group.

5. The method of claim 1, wherein the second request to modify the established PDP context includes a request for a plurality of interne protocol (IP) addresses to be allocated to a plurality of devices that are members of the shared context group sharing the established shared PDP context.

6. The method of claim 1, wherein an indication that the first WTRU is a member of the shared context group is included in an evolved packet service (EPS) attach type information element.

7. The method of claim 1, wherein the second WTRU in the shared context group is a third generation partnership project (3GPP) device or a non-third generation partnership project (non-3GPP) device.

8. A first wireless transmit/receive unit (WTRU) comprising:
    a transmitter configured to send a first request to establish a packet data protocol (PDP) context, wherein the PDP context is associated with the first WTRU;
    a processor configured to establish the PDP context;
    the transmitter configured to send a second request to modify the established PDP context, wherein the second request to modify the established PDP context comprises an indication to allow the established PDP context to be shared by a second WTRU thereby modifying the established PDP context into an established shared PDP context; and
    a receiver configured to receive a response indicating that the second request to modify the established PDP context was accepted, wherein the response comprises information associated with the established shared PDP context, and wherein the first WTRU acts as a gateway for the second WTRU in a shared context group.

9. The first WTRU of claim 8, wherein the processor is further configured to share an internet protocol (IP) address with the second WTRU.

10. The first WTRU of claim 8, wherein the indication comprises a group international mobile subscriber identity (IMSI) or a group identifier (ID).

11. The first WTRU of claim 10, wherein the processor is further configured to perform authentication with at least one core network node and there is a sequence of authentication for devices in the shared context group.

12. The first WTRU of claim 11, wherein the processor is further configured to dynamically determine the sequence of authentication for devices in the shared context group.

13. The first WTRU of claim 8, wherein the response indicating that the request to modify the PDP context was accepted indicates a number of internet protocol (IP) addresses allocated and a starting IP address.

14. The first WTRU of claim 8, wherein the response indicating that the request to modify the PDP context was accepted explicitly indicates an internet protocol address to be allocated to the second WTRU.

15. The method of claim 1, comprising the first WTRU forwarding the received response to the second WTRU.

16. The first WTRU of claim 8, wherein the processor is configured to forward the received response to the second WTRU.

17. The first WTRU of claim 8, wherein the second request to modify the established PDP context includes a request for a plurality of internet protocol (IP) addresses to be allocated to a plurality of devices that are members of the shared context group sharing the established shared PDP context.

* * * * *